(12) United States Patent
Binkholder et al.

(10) Patent No.: US 9,180,967 B2
(45) Date of Patent: Nov. 10, 2015

(54) CONFIGURABLE POD STRUCTURE AND STORE STOWAGE AND DEPLOYMENT SYSTEM AND METHOD

(75) Inventors: Ryan Binkholder, St. Louis, MO (US); John K. Foster, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 895 days.

(21) Appl. No.: 13/407,692

(22) Filed: Feb. 28, 2012

(65) Prior Publication Data

US 2013/0221158 A1   Aug. 29, 2013

(51) Int. Cl.
*B64D 7/08* (2006.01)
*F41F 3/065* (2006.01)

(52) U.S. Cl.
CPC .. *B64D 7/08* (2013.01); *F41F 3/065* (2013.01)

(58) Field of Classification Search
CPC ........... B64G 1/00; E21B 43/116; F41F 5/00; B64D 1/04; B64D 1/12
USPC ............ 244/137.4, 172.1; 89/1.51, 1.52–1.57
See application file for complete search history.

(56) References Cited

U.S. PATENT DOCUMENTS

| | | | | |
|---|---|---|---|---|
| 2,749,064 | A | * | 6/1956 | Kuhlman, Jr. ............... 244/137.1 |
| 4,702,145 | A | * | 10/1987 | Kannapell et al. ............ 89/1.803 |
| 5,803,405 | A | * | 9/1998 | Ellis et al. ...................... 244/130 |
| 5,904,323 | A | | 5/1999 | Jakubowski, Jr. et al. |
| 5,975,463 | A | * | 11/1999 | Gruensfelder et al. .... 244/118.1 |
| 6,060,411 | A | * | 5/2000 | Cline et al. .................... 442/132 |
| 6,460,445 | B1 | * | 10/2002 | Young et al. ................... 89/1.51 |
| 6,536,711 | B1 | * | 3/2003 | Conway et al. ............. 244/129.5 |
| 6,663,047 | B1 | * | 12/2003 | Arata .......................... 244/137.1 |
| 6,688,209 | B1 | * | 2/2004 | McMahon et al. ............. 89/1.59 |
| 7,520,467 | B2 | * | 4/2009 | Gioffre et al. .............. 244/118.1 |

(Continued)

FOREIGN PATENT DOCUMENTS

| | | | |
|---|---|---|---|
| WO | 2009045577 A1 | 4/2009 | |
| WO | WO 2009061347 A1 * | 5/2009 | ............. B64D 47/08 |

OTHER PUBLICATIONS

Graham Warwick, "Growth Super Hornet Mock-up Heads for Aero India", Aviation Week Intelligence Network, Aviation Week & Space Technology, Jan. 17, 2011, 3 pages.

(Continued)

*Primary Examiner* — Tien Dinh
*Assistant Examiner* — Assres H Woldemaryam

(57) ABSTRACT

In one embodiment there is provided a radar signature and induced aerodynamic drag minimizing, externally mountable, internally configurable pod structure optimized for internal placement of one or more deployable stores through configuration and optimal kinematic operation of a pod door assembly. The pod structure has an externally mountable pod housing, a predetermined pod housing cross-sectional configuration optimized to provide a configurable interior volume accommodating multiple different store configurations, and a predetermined pod housing configuration having a cross-sectional configuration optimized to minimize a radar signature and an induced aerodynamic drag. The pod structure further has a pod door assembly integral with the pod housing and having a plurality of pod doors and one or more seal door mechanism assemblies. The pod structure is optimized in kinematic operational combination of the pod doors and seal door mechanism assemblies controlling ejection launch envelopes.

19 Claims, 22 Drawing Sheets

(56) References Cited

U.S. PATENT DOCUMENTS

| | | | |
|---|---|---|---|
| 7,610,841 B2 | 11/2009 | Padan | |
| 8,141,468 B2 * | 3/2012 | Van Liew et al. | 89/1.54 |
| 8,893,605 B1 * | 11/2014 | Hester et al. | 89/1.51 |
| 2004/0011926 A1 * | 1/2004 | Shay et al. | 244/118.1 |
| 2005/0204910 A1 * | 9/2005 | Padan | 89/1.813 |
| 2006/0081733 A1 * | 4/2006 | Lam et al. | 244/137.4 |
| 2006/0108476 A1 * | 5/2006 | Padan | 244/135 R |
| 2009/0100995 A1 * | 4/2009 | Fisher | 89/1.11 |
| 2009/0100996 A1 | 4/2009 | Jakubowski, Jr. et al. | |
| 2010/0206988 A1 * | 8/2010 | Woodland | 244/129.5 |
| 2010/0230534 A1 * | 9/2010 | Bravo et al. | 244/107 |

OTHER PUBLICATIONS

Intellectual Property Office of the United Kingdom, Combined Search and Examination Report under Sections 17 & 18 (3), for Counterpart Application No. GB1302569.7, Applicant The Boeing Company, Date of search Jun. 13, 2013, Date of report Jun. 14, 2013, 2 pages.

* cited by examiner

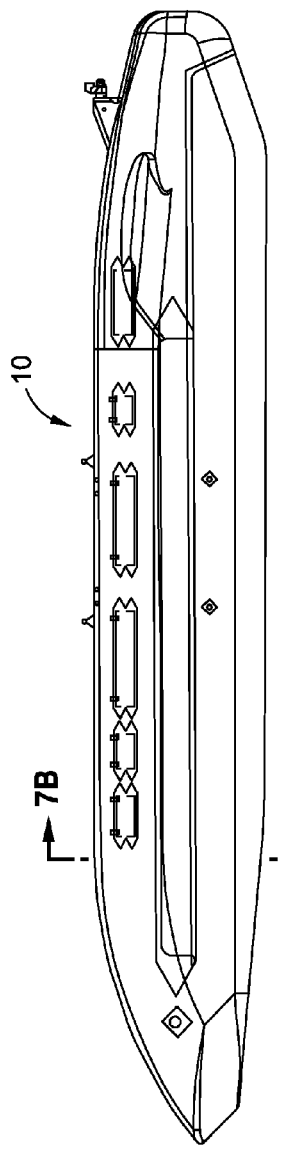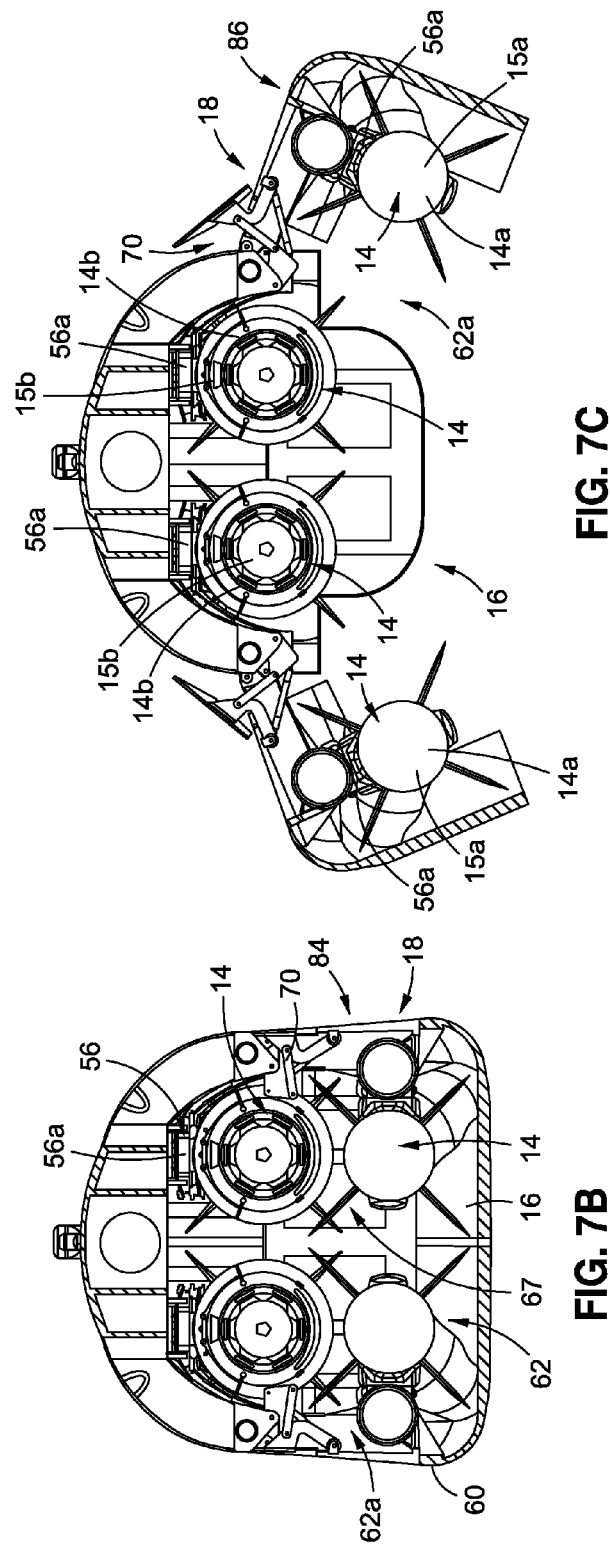

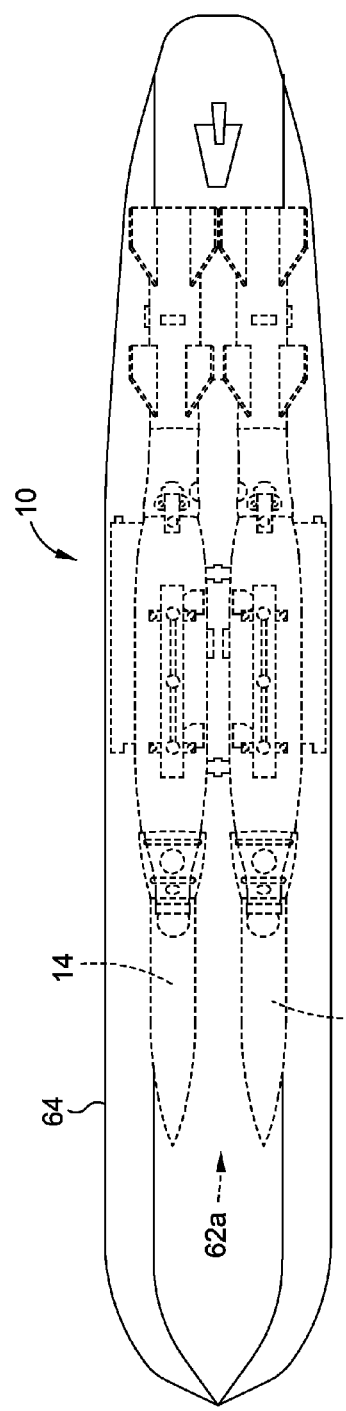
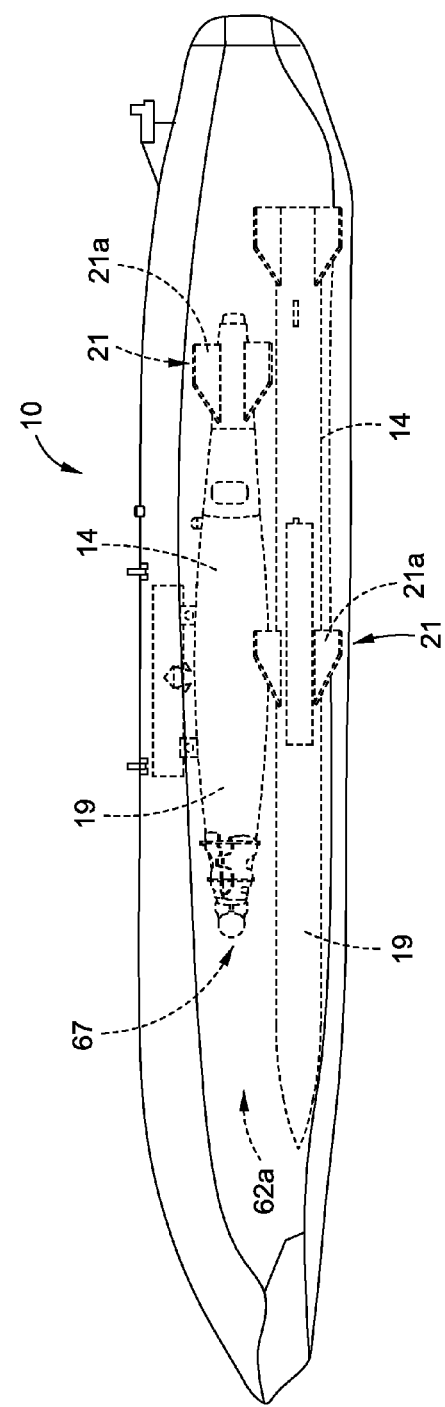
FIG. 7D
FIG. 7E

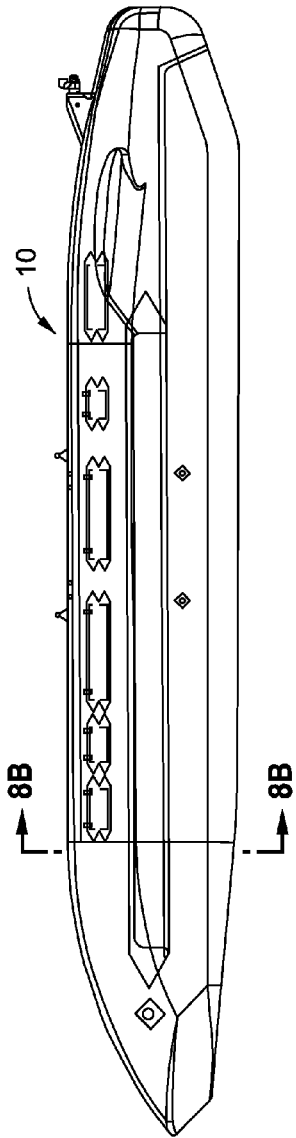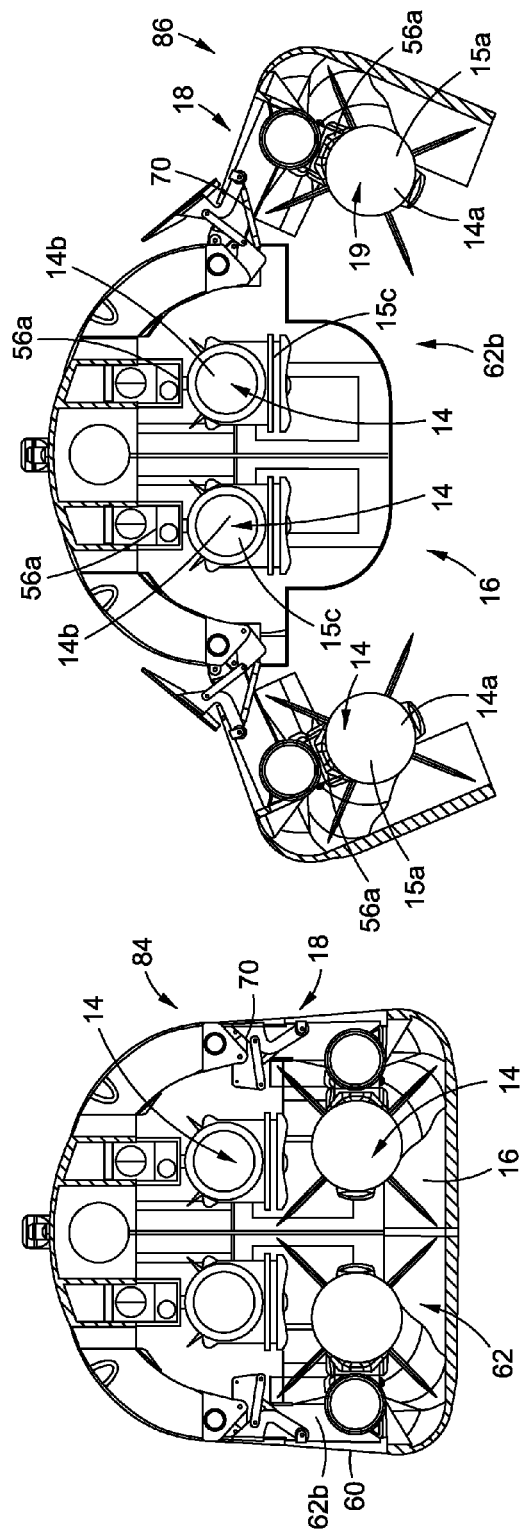

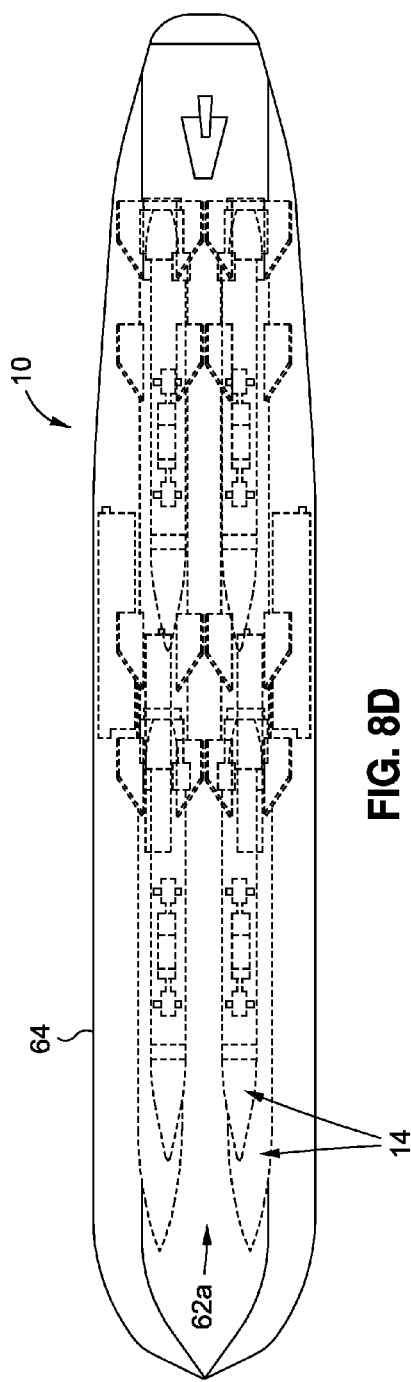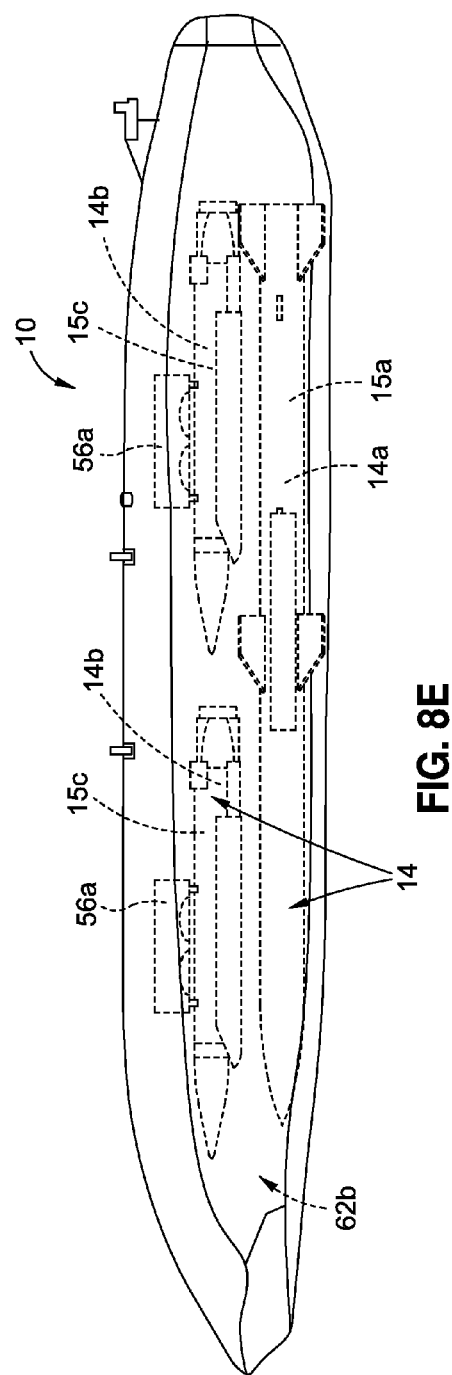

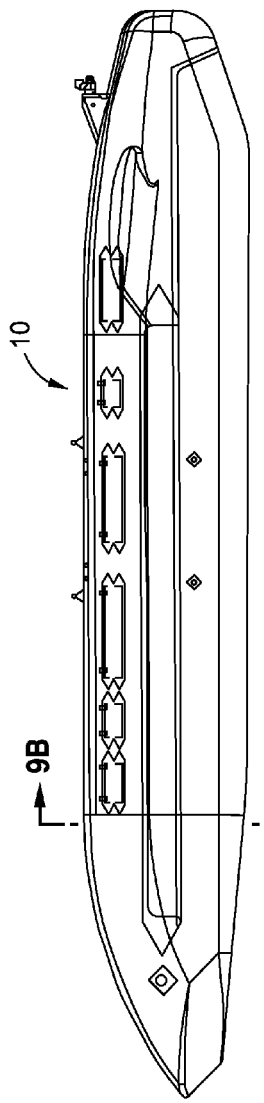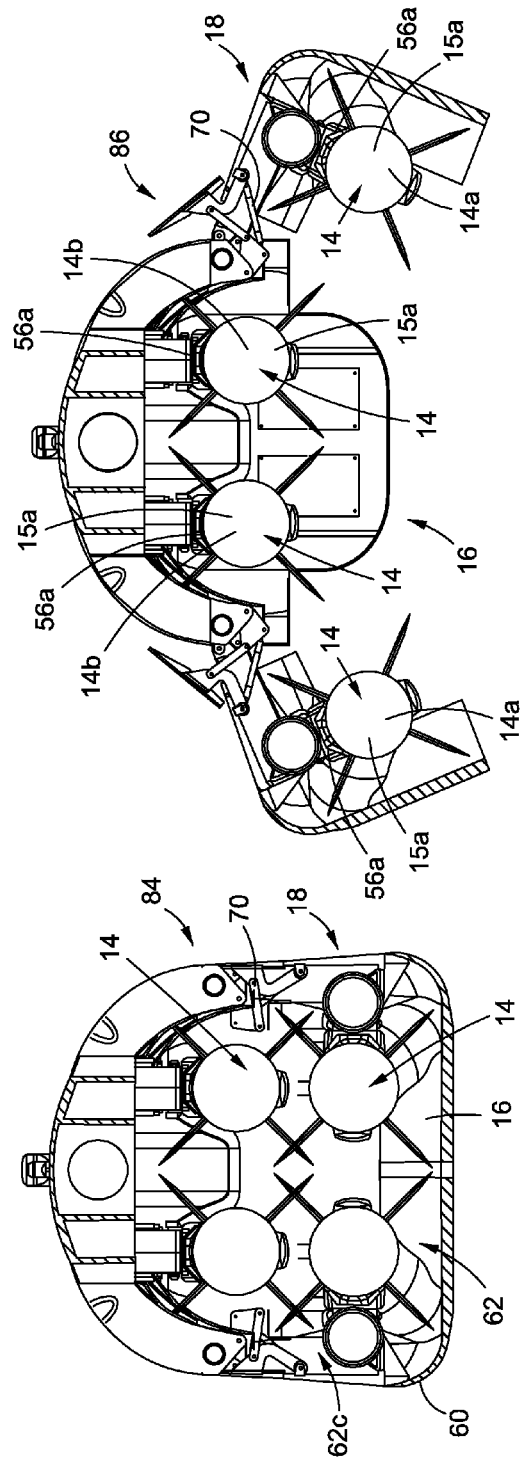

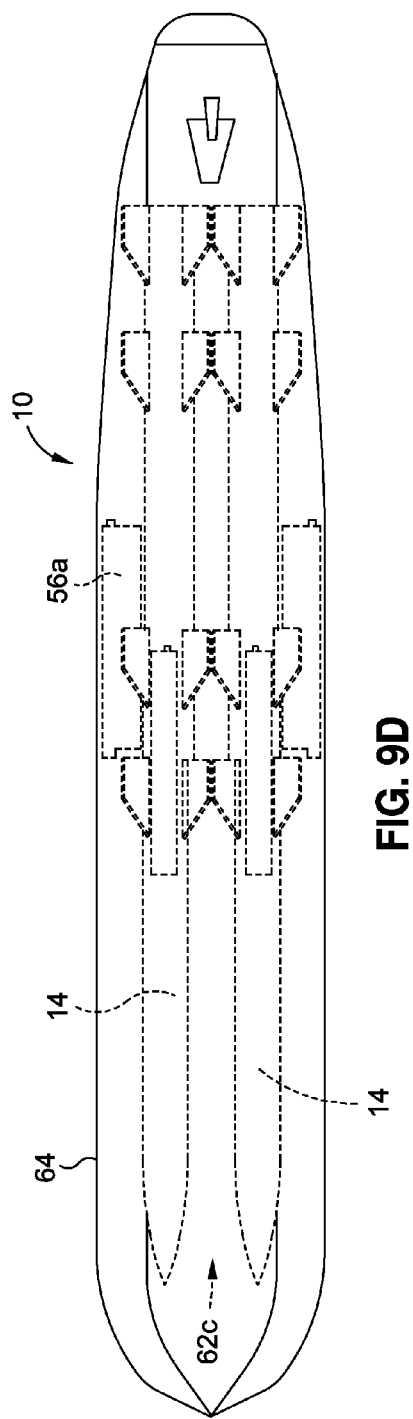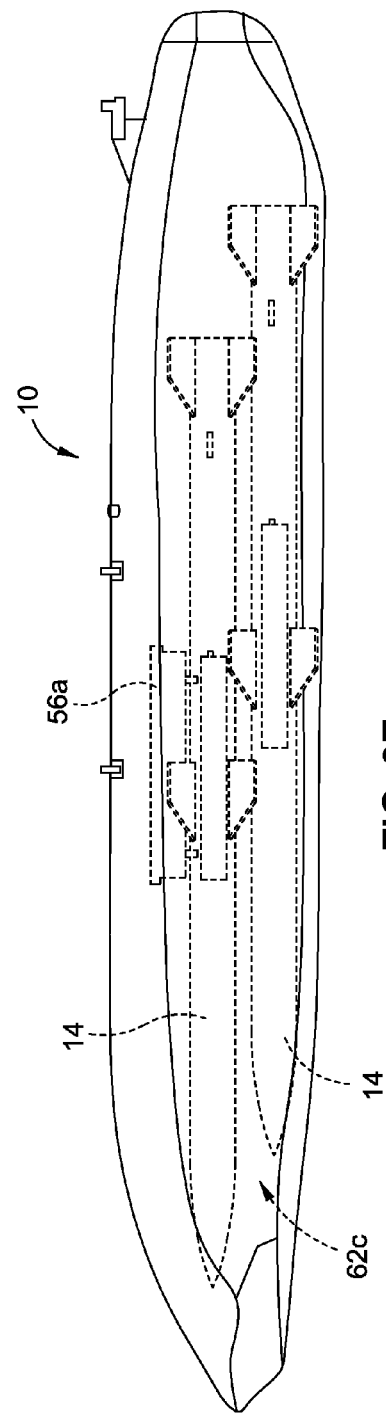

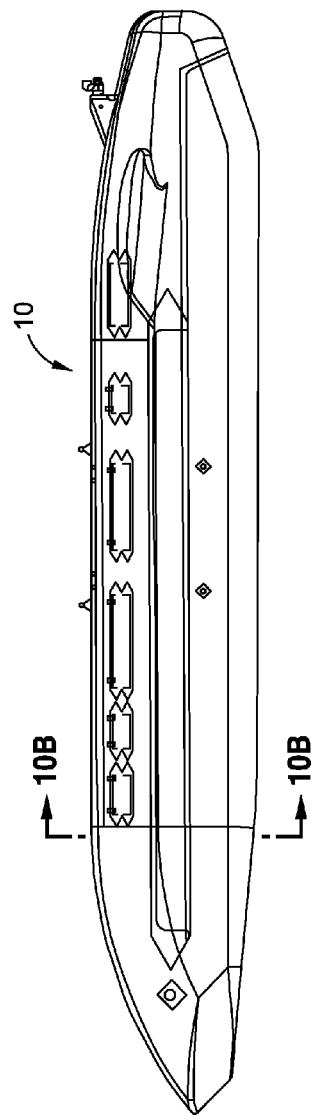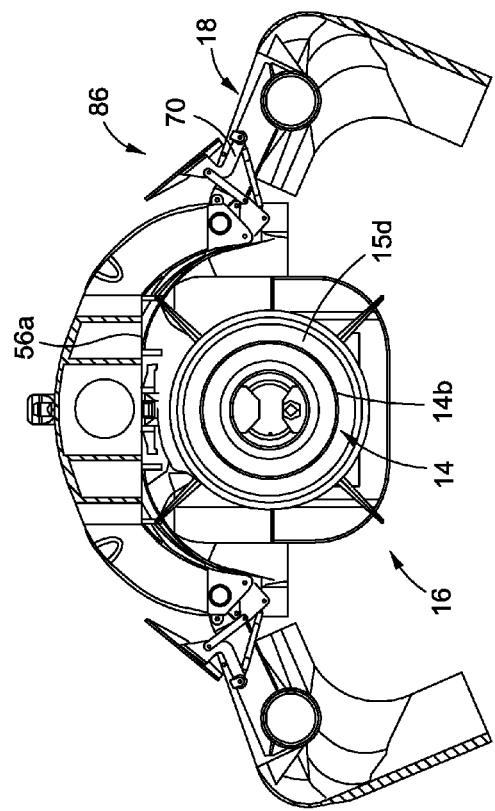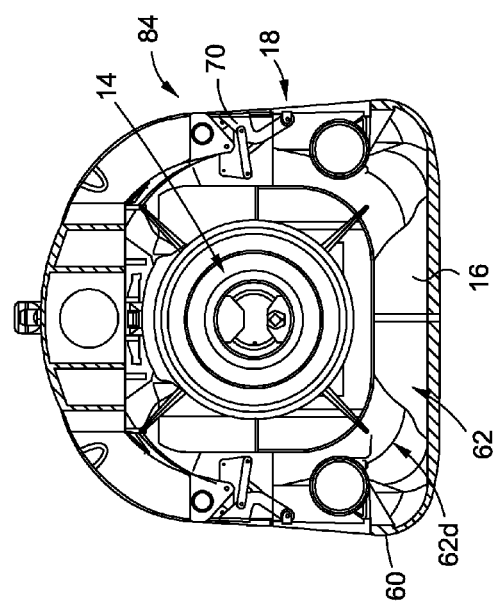

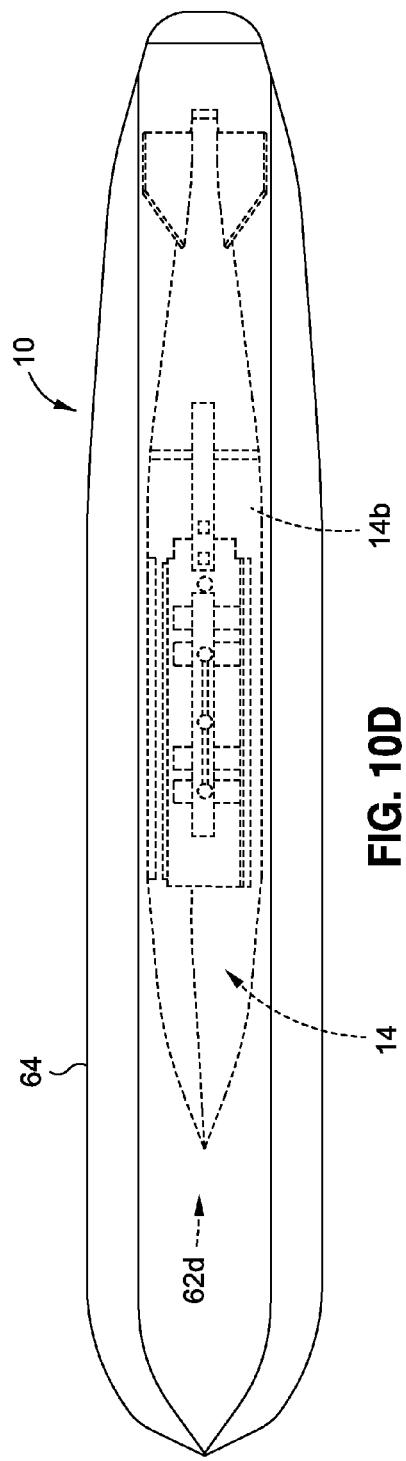
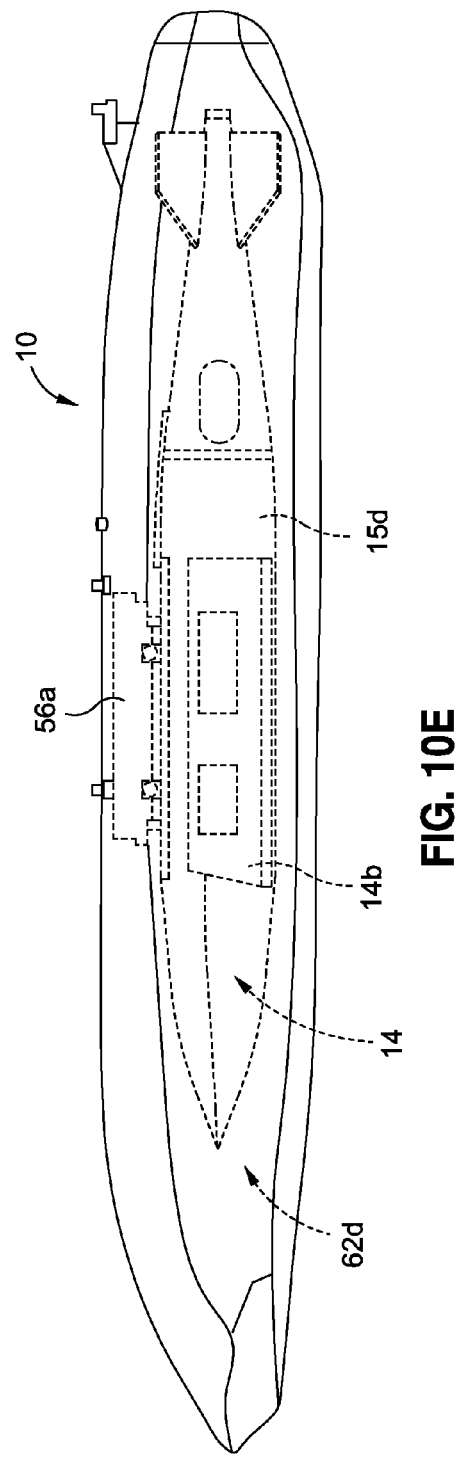
FIG. 10D
FIG. 10E

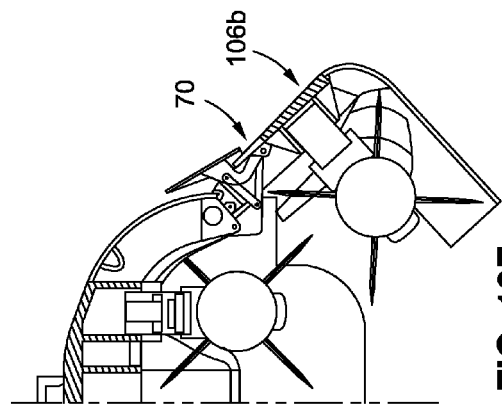
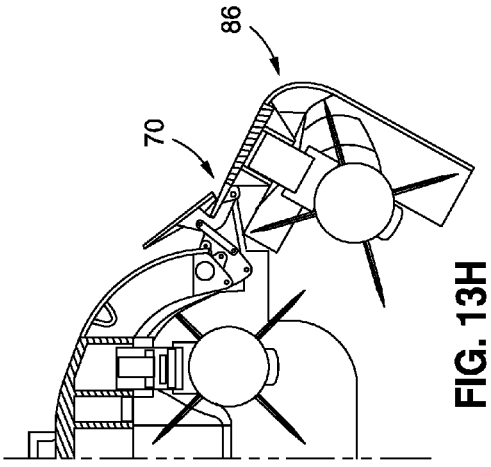
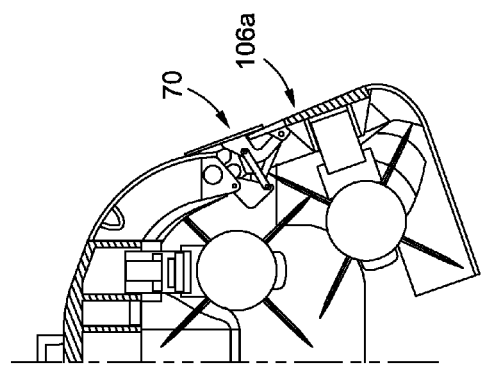
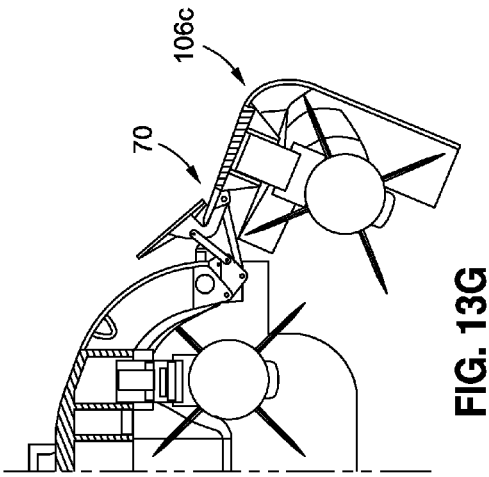
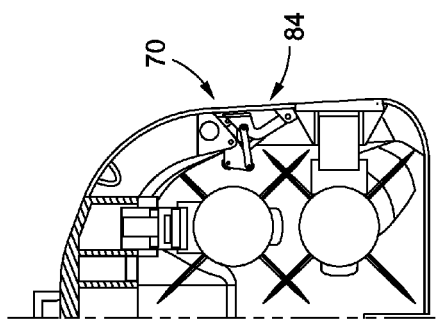

CONFIGURABLE POD STRUCTURE AND STORE STOWAGE AND DEPLOYMENT SYSTEM AND METHOD

BACKGROUND

1) Field of the Disclosure

The disclosure relates generally to store stowage and deployment systems and methods, and more particularly, to externally mounted store stowage and deployment systems and methods for use on aerial vehicles, such as stealth and military aircraft.

2) Description of Related Art

Store stowage and deployment systems are commonly used on stealth and military aircraft to carry and release missiles, bombs, and other weapons and materials, generally referred to as "stores". Such store stowage and deployment systems are typically mounted on an underside of the aircraft, such as on a wing pylon or within a fuselage bay.

A primary mission of stealth aircraft is typically to perform a mission, such as deploying stores, while avoiding a target's sensors, such as radar. Known stealth aircraft exist that internally stow mission stores within the aircraft in order to minimize a radar signature. However, internal carriage of stores occupies valuable aircraft volume and leads to design compromises that may affect the aircraft's performance characteristics. For example, volume reserved for internal stores may displace or reduce space for fuel, engines, avionics, or other subsystems. The design tradeoffs that result may have an impact on the aircraft performance, for example, reduced range, acceleration, and top speed. The resultant payload of the stealth aircraft may be significantly less than comparable external carriage aircraft. The stealth characteristics of an aircraft may only be needed in the presence of air defenses. Once the air defenses are neutralized, internal carriage of stores may no longer be needed and use of the stealth aircraft may be reduced in favor of higher payload, external carriage aircraft. Moreover, known internal stores or weapons bays may require a design as part of a new aircraft as it may be difficult to retrofit such internal stores or weapons bay or carriage onto an existing aircraft.

Known external store carriage systems exist for use with military aerial vehicles, such as combat aircraft, attack helicopters, and the like. However, like radar signature, such known external store carriage systems may create negative effects on the aerodynamic performance of the military aerial vehicles due to increased aerodynamic drag.

Moreover, such known external store carriage systems may be designed for a specific internal store configuration or loadout and changing the desired internal store configuration or loadout means changing to a structurally and/or mechanically different external store carriage system or structure. Finally, the internal configuration and door opening mechanisms of known external store carriage systems may not provide sufficient clearance for a store to be separately ejected without interference from the other stores if a store ejector device fails to deploy a store or there is a some other problem with a store deploying.

Accordingly, there is a need in the art for externally mounted, internally configurable store stowage and deployment devices, systems and methods that provide advantages over known devices, systems and methods.

SUMMARY

This need for externally mounted, internally configurable store stowage and deployment devices, systems and methods is satisfied. As discussed in the below detailed description, embodiments of the externally mounted, internally configurable store stowage and deployment devices, systems and methods may provide significant advantages over known devices, systems, and methods.

In an embodiment of the disclosure, there is provided a radar signature minimizing and induced aerodynamic drag minimizing, externally mountable, internally configurable pod structure optimized for internal placement of one or more deployable stores through configuration and optimal kinematic operation of a pod door assembly. The pod structure comprises an externally mountable pod housing. The pod housing comprises a predetermined pod housing cross-sectional configuration optimized to provide a configurable interior volume accommodating multiple different store configurations. The pod housing further comprises a predetermined pod housing configuration having a cross-sectional configuration optimized to minimize a radar signature and optimized to minimize an induced aerodynamic drag. The pod structure further comprises a pod door assembly integral with the pod housing and comprising a plurality of pod doors and one or more seal door mechanism assemblies. The pod structure is optimized in kinematic operational combination of the pod doors and seal door mechanism assemblies controlling ejection launch envelopes where the seal door mechanism assemblies operationally linked to the pod doors provide in an open position a clearance independence such that if a store ejector device fails to deploy a deployable store coupled to the store ejector device, no trapped deployable stores occur within the pod structure.

In another embodiment of the disclosure, there is provided a radar signature minimizing and induced aerodynamic drag minimizing, externally mountable, internally configurable store stowage and deployment system for an aerial vehicle. The system comprises an externally mountable, internally configurable pod structure configured for mounting to an aerial vehicle. The pod structure comprises an externally mountable pod housing. The pod housing comprises a predetermined pod housing cross-sectional configuration optimized to provide a configurable interior volume accommodating multiple different store configurations. The pod housing further comprises a predetermined pod housing configuration having a cross-sectional configuration optimized to minimize a radar signature and optimized to minimize an induced aerodynamic drag. The pod structure further comprises a pod door assembly integral with the pod housing and comprising a plurality of pod doors and one or more seal door mechanism assemblies. The pod structure is optimized in kinematic operational combination of the pod doors and seal door mechanism assemblies controlling ejection launch envelopes, where the seal door mechanism assemblies operationally linked to the pod doors provide in an open position a clearance independence such that if a store ejector device fails to deploy a deployable store coupled to the store ejector device, no trapped deployable stores occur within the pod structure. The system further comprises a door drive system coupled to the pod structure and configured to drive the pod door assembly. The system further comprises a pneumatic compressor system coupled to the pod structure and configured to deploy one or more deployable stores out of the pod structure. The system further comprises a control system coupled to the pod structure and configured to control operation and deployment of the one or more deployable stores. The system further comprises a power system coupled to the pod structure and configured to provide power to the configurable store stowage and deployment system.

In another embodiment of the disclosure, there is provided a method for minimizing radar signature and induced aerodynamic drag and for optimizing an interior store volume of an externally mountable store stowage and deployment system on an aerial vehicle. The method comprises providing an externally mountable, internally configurable store stowage and deployment system having a pod structure. The pod structure comprises an externally mountable pod housing. The pod housing comprises a predetermined pod housing cross-sectional configuration optimized to provide a configurable interior volume accommodating multiple different store configurations. The pod housing further comprises a predetermined pod housing configuration having a cross-sectional configuration optimized to minimize a radar signature and optimized to minimize an induced aerodynamic drag. The pod structure further comprises a pod door assembly integral with the pod housing and comprising a plurality of pod doors and one or more seal door mechanism assemblies. The pod structure is optimized in kinematic operational combination of the pod doors and seal door mechanism assemblies controlling ejection launch envelopes. The method further comprises installing one or more deployable stores and one or more corresponding store ejector devices in the configurable interior volume of the pod housing, where the seal door mechanism assemblies operationally linked to the pod doors provide in an open position a clearance independence such that if one store ejector device fails to deploy a deployable store coupled to the store ejector device, no trapped deployable stores occur within the pod structure. The method further comprises mounting to an exterior portion of an aerial vehicle the store stowage and deployment system with the one or more deployable stores installed in the pod structure.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 7A is an illustration of a side view of a pod structure of the disclosure;

FIG. 7B is an illustration of a cross-sectional view taken along lines 7B-7B of FIG. 7A showing a first embodiment of a store configuration in the configurable interior volume of the pod structure;

FIG. 7C is an illustration of a cross-sectional view of the first embodiment of the store configuration of FIG. 7B with a pod door assembly in a fully open position;

FIG. 7D is an illustration of a top view of the pod structure of FIG. 7A showing a store configuration of deployable stores in phantom lines;

FIG. 7E is an illustration of a side view of the pod structure of FIG. 7D showing the store configuration of deployable stores in phantom lines;

FIG. 8A is an illustration of a side view of one of the embodiments of a pod structure of the disclosure similar to the pod structure of FIG. 7A;

FIG. 8B is an illustration of a cross-sectional view taken along lines 8B-8B of FIG. 8A showing a second embodiment of a store configuration in the configurable interior volume of the pod structure;

FIG. 8C is an illustration of a cross-sectional view of the second embodiment of the store configuration of FIG. 8B with a pod door assembly in a fully open position;

FIG. 8D is an illustration of a top view of the pod structure of FIG. 8A showing a store configuration of deployable stores in phantom lines;

FIG. 8E is an illustration of a side view of the pod structure of FIG. 8D showing the store configuration of deployable stores in phantom lines;

FIG. 9A is an illustration of a side view of one of the embodiments of a pod structure of the disclosure similar to the pod structure of FIGS. 7A and 8A;

FIG. 9B is an illustration of a cross-sectional view taken along lines 9B-9B of FIG. 9A showing a third embodiment of a store configuration in the configurable interior volume of the pod structure;

FIG. 9C is an illustration of a cross-sectional view of the third embodiment of the store configuration of FIG. 9B with a pod door assembly in a fully open position;

FIG. 9D is an illustration of a top view of the pod structure of FIG. 9A showing a store configuration of deployable stores in phantom lines;

FIG. 9E is an illustration of a side view of the pod structure of FIG. 9D showing the store configuration of deployable stores in phantom lines;

FIG. 10A is an illustration of a side view of one of the embodiments of a pod structure of the disclosure similar to the pod structure of FIGS. 7A, 8A, and 9A;

FIG. 10B is an illustration of a cross-sectional view taken along lines 10B-10B of FIG. 10A showing a fourth embodiment of a store configuration in the configurable interior volume of the pod structure;

FIG. 10C is an illustration of a cross-sectional view of the fourth embodiment of the store configuration of FIG. 10B with a pod door assembly in a fully open position;

FIG. 10D is an illustration of a top view of the pod structure of FIG. 10A showing a store configuration of a deployable store in phantom lines;

FIG. 10E is an illustration of a side view of the pod structure of FIG. 10D showing the store configuration of the deployable store in phantom lines;

FIGS. 13D-13H are illustrations of front cross-sectional views showing various stages of operation of a seal door mechanism assembly when a pod door assembly is opened;

DETAILED DESCRIPTION

Figure 1:
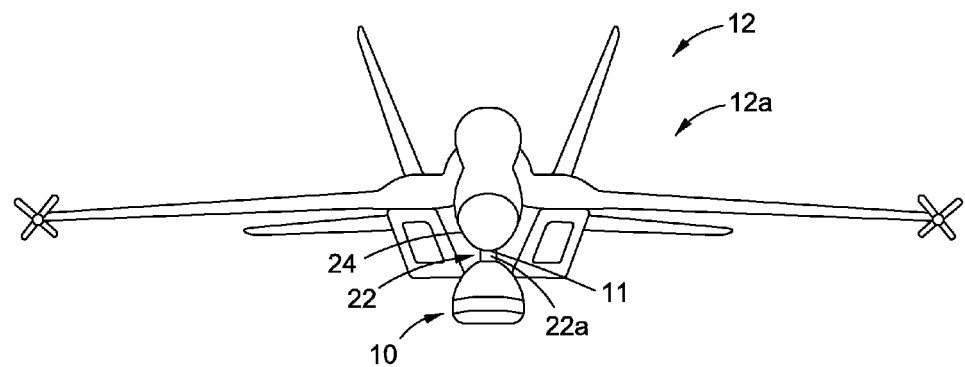
FIG. 1 is an illustration of a front view of one of the embodiments of a pod structure of the disclosure mounted to a centerline pylon on an aerial vehicle.

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Now referring to the Figures, in an embodiment of the disclosure, there is provided a pod structure 10 (see FIGS. 3A, 5, 6B), discussed in further detail below. The pod structure 10 is externally mountable, and is preferably externally mountable to an exterior portion 11 of an aerial vehicle 12 (see FIGS. 1A, 2A). The pod structure 10 is internally configurable and optimized for internal placement of one or more deployable stores 14 (see FIGS. 1A, 2A, 3D) through configuration in a configurable interior volume 16 (see FIG. 3D) and through optimal kinematic operation of a pod door assembly 18 (see FIGS. 3D, 13A-13C). In another embodiment of the disclosure, the pod structure 10 is part of a configurable store stowage and deployment system 20 (see FIG. 4) for an aerial vehicle 12. The configurable store stowage and deployment system 20 is discussed in further detail below. The one or more deployable stores 14 may comprise a missile, an aerodynamic missile, an air to air missile, an aerial bomb, an air to ground bomb, an extended range air to ground bomb, a small diameter bomb, miniature aerial vehicle, an unmanned aerial vehicle, a drone, a joint standoff weapon, a joint standoff missile, a micro-satellite, a multi-payload airborne store comprising an expendable electronic counter measure dispenser and a tactical. However, for purposes of this application, the term "store" is a generic term which broadly encompasses any item of cargo which may be carried, released and/or delivered from an aerial vehicle.

Preferably, the pod structure 10 is reusable with the same aerial vehicle 12 or a different aerial vehicle 12 after deployment of the one or more deployable stores 14 out of the pod structure 10. The endurance life of the pod structure 10 may be about 6000 hours and is preferably designed for repeated use.

FIG. 1 is an illustration of a front view of one of the embodiments of a pod structure 10 of the disclosure mounted to an aerial vehicle 12, such as, for example, in the form of a twin-engine fighter aerial vehicle 12a. In one embodiment, as shown in FIG. 1, one pod structure 10 may be mounted to an exterior portion 11 of the aerial vehicle 12a via a pylon 22, such as a centerline pylon 22a, on the aerial vehicle 12a. As further shown in FIG. 1A, the centerline pylon 22a is positioned on a fuselage portion 24 under the aerial vehicle 12a.

Figure 2:
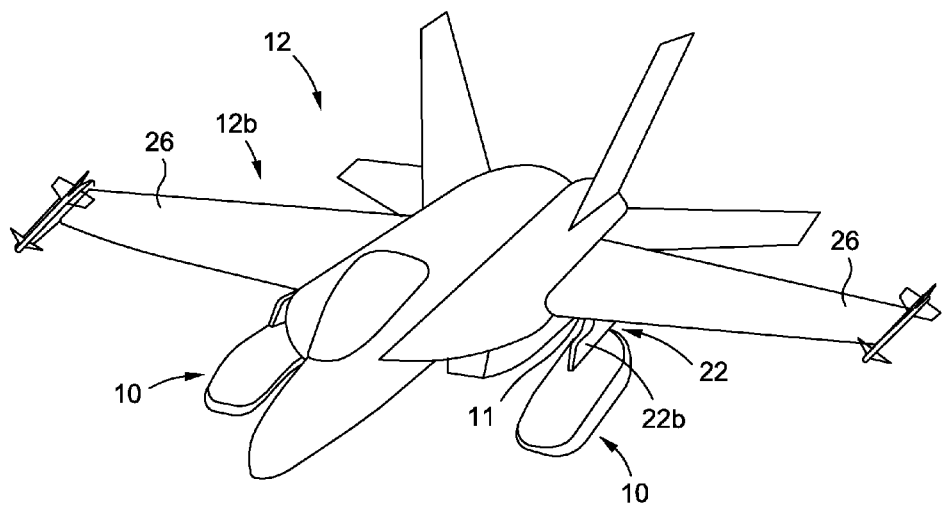
FIG. 2 is an illustration of a perspective view of a pod structure of the disclosure mounted to mid-board pylons on an aerial vehicle.

In another embodiment, as shown in FIG. 2, two pod structures 10 may be mounted to an aerial vehicle 12, such as, for example, in the form of a multirole fighter aerial vehicle 12b. FIG. 2 is an illustration of a perspective view of the pod structures 10 of the disclosure mounted to an exterior portion 11 of the aerial vehicle 12b. As shown in FIG. 2, each pod structure 10 is mounted to an exterior portion 11 of the aerial vehicle 12a via a pylon 22, such as a mid-board pylon 22b, positioned under each of two wings 26 of the aerial vehicle 12b. FIG.

Figure 3A:
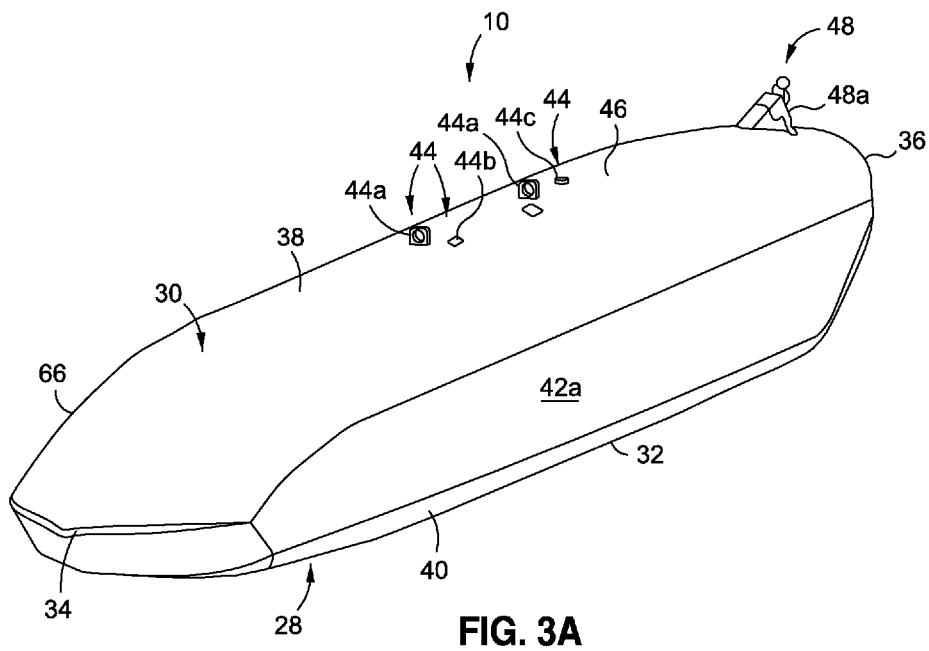
FIG. 3A is an illustration of a top side perspective view of a pod structure of the disclosure in a closed position.
Figure 3B:
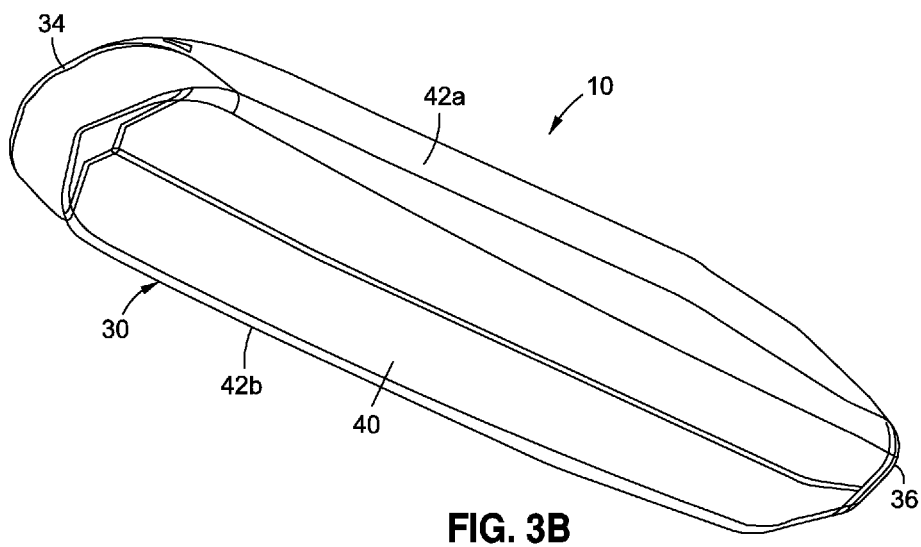
FIG. 3B is an illustration of a bottom perspective view of the pod structure of FIG. 3A.

FIG. 3A is an illustration of a top side perspective view of one of the embodiments of the pod structure 10 of the disclosure in a closed position 28. FIG. 3B is an illustration of a bottom perspective view of the pod structure 10 of FIG. 3A. As shown in FIGS. 3A-3B, the pod structure 10 comprises a pod housing 30 that is externally mountable, and is preferably externally mountable to an exterior portion 11 of an aerial vehicle 12 (see FIGS. 1-2). As shown in FIG. 3A, the pod housing 30 has a predetermined pod housing configuration 32, a forward end 34, an aft end 36, a top portion 38, a bottom portion 40, and sides 42a, 42b (see FIG. 3B).

As further shown in FIG. 3A, the pod structure 10 comprises one or more interface elements 44, such as in the form of lugs 44a, swaybrace pads 44b, and an electrical connector 44c, or another suitable interface element. The interface elements 44 are preferably coupled to or formed in an exterior 46 of the pod structure 10 on the top portion 38 of the pod structure 10 and are configured to interface with an exterior portion 11 (see FIGS. 1-2) of the aerial vehicle 12 (see FIGS. 1-2), such as the pylon(s) 22 (see FIGS. 1-2) of the aerial vehicle 12, to aid in external mounting of the pod structure 10 to the exterior portion 11 of the aerial vehicle 12.

As shown in FIG. 3A, the pod structure 10 further comprises a jettison element 48, such as in the form of a pivot post 48a, or other suitable jettison element. The jettison element 48 is preferably coupled to the exterior 46 of the pod structure 10 on the top portion 38 of the pod structure 10 toward the aft end 36. The jettison element 48 is preferably configured to jettison the pod structure 10 from the aerial vehicle 12.

Figure 5:
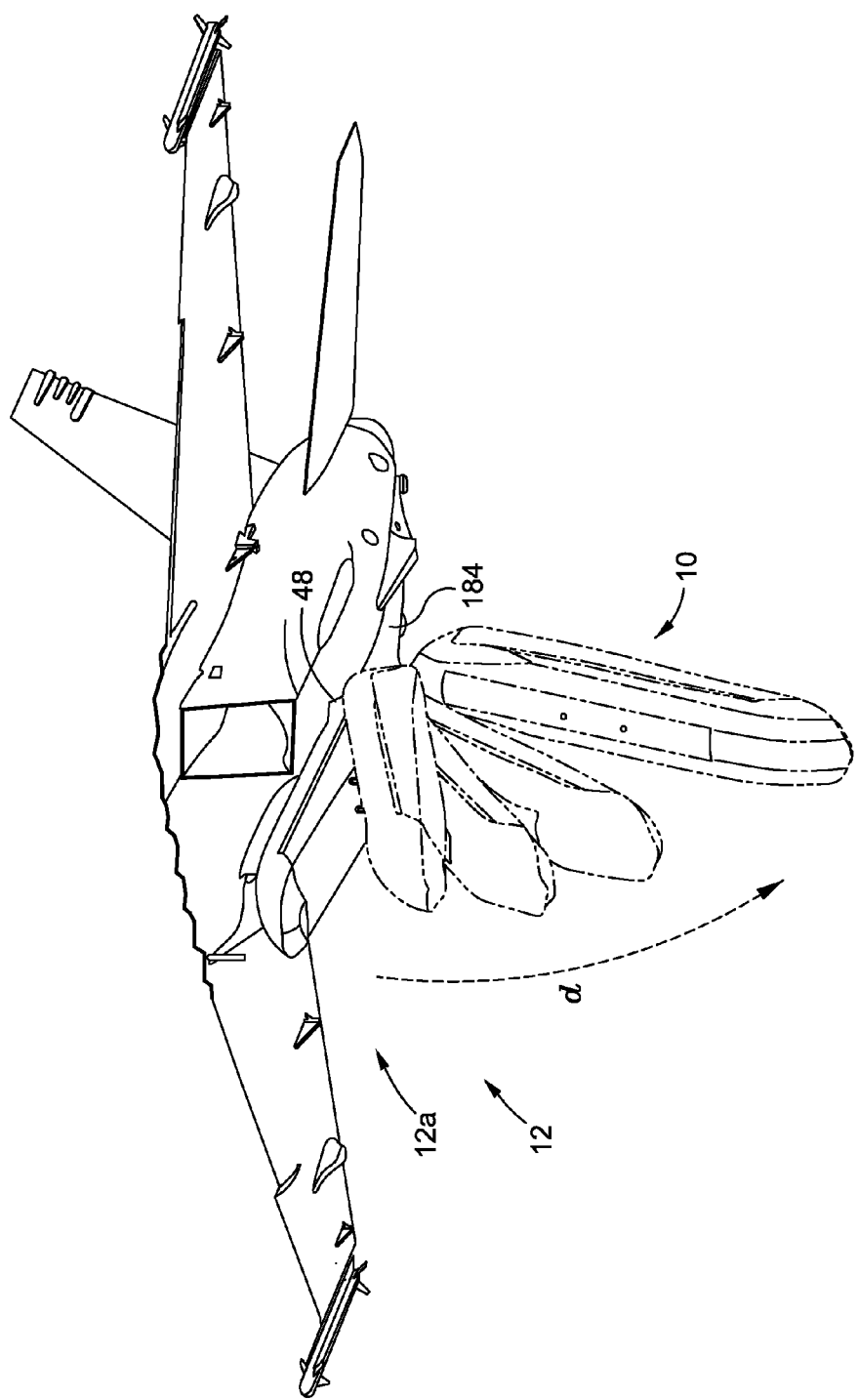
FIG. 5 is an illustration of a front perspective view of a pod structure of the disclosure being jettisoned from an aerial vehicle.

FIG. 5 is an illustration of a front perspective view of the pod structure 10 of the disclosure being jettisoned from an aerial vehicle 12a. In certain instances, a given mission may require jettisoning the pod structure 10, such as in the case of mechanical or electrical failure or as a result of a stealth mission or other mission requirement. In this event, as shown in FIG. 5, a parent rack 184 of the aerial vehicle 12 will be commanded to unlock and eject. When the pod structure 10 is ejected or jettisoned from the aerial vehicle 12a, the pod structure 10 disengages from the aerial vehicle 12a except at the jettison element 48 and the pod structure 10 pivots downwardly in direction d via the jettison element 48 and is then completely released from the aerial vehicle 12a. Once the pod structure 10 is clear of the aerial vehicle 10, the mission may resume.

Figure 3C:
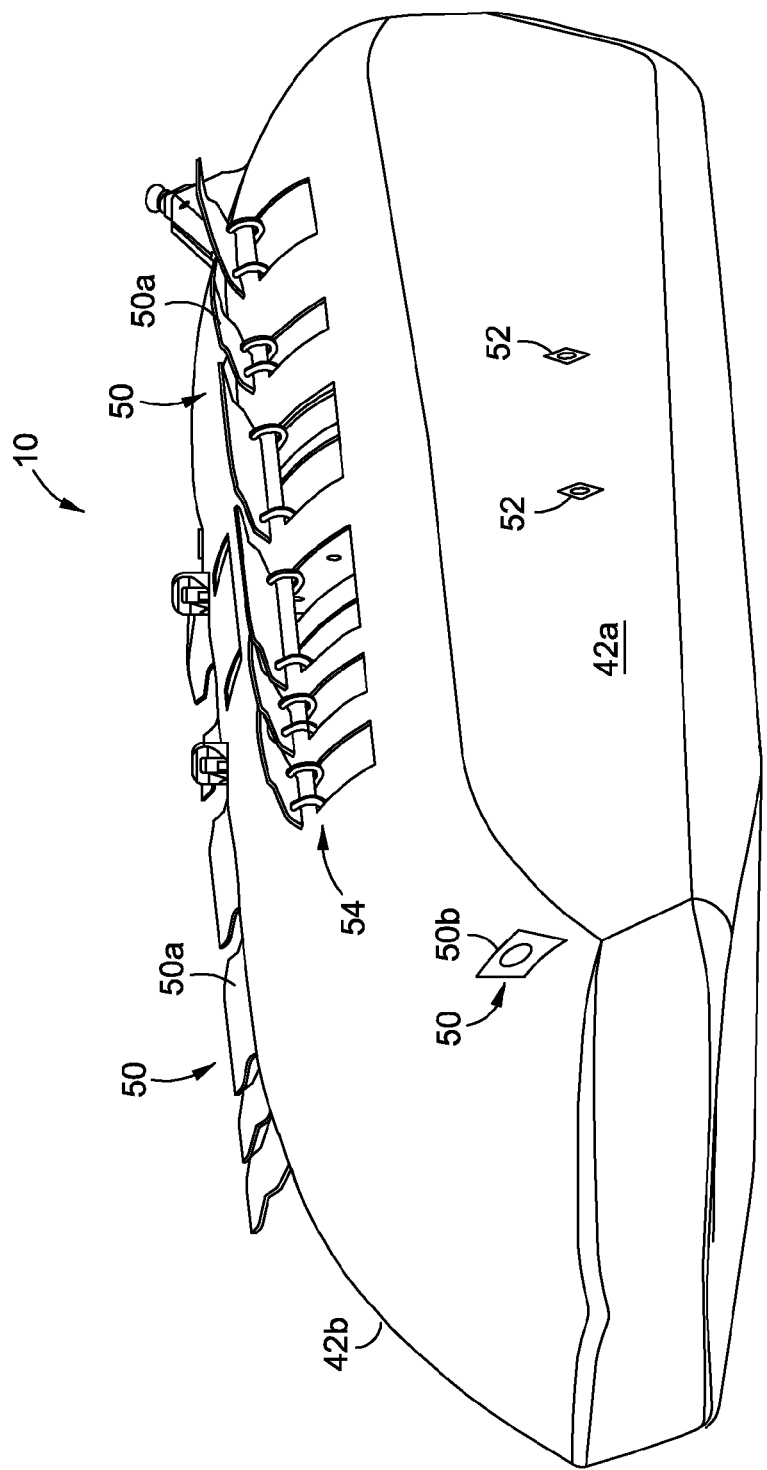
FIG. 3C is an illustration of a front side perspective view of the pod structure of FIG. 3A showing manual access doors and hoist points.

FIG. 3C is an illustration of a front side perspective view of the pod structure 10 of FIG. 3A showing manual access doors 50 on the pod structure 10 and hoist points 52 on side 42a of the pod structure 10. Similar hoist points 52 are also present on side 42b. The manual access doors 50 may comprise upper access doors 50a which are shown in FIG. 3C in an open position 54. The manual access doors 50 may further comprise manual door drive access doors 50b. The manual access doors 50 allow for manual access into the pod structure 10, for example, for manual access in order to install the deployable stores 14 (see FIG. 3D) and store ejector devices 56 (see FIG. 4), such as in the form of store ejector racks 56a (see FIG. 4), into the configurable interior volume 16 (see FIG. 3D) of the pod structure 10. The hoist points 52 are used to assist in raising, lowering and carrying the pod structure 10. The pod structure 10 has the capability to be reconfigured with various deployable stores 14 and store ejector devices 56, such as in the form of store ejector racks 56a, to meet a particular mission objective, such as air patrol or ground target attack.

Figure 3D:
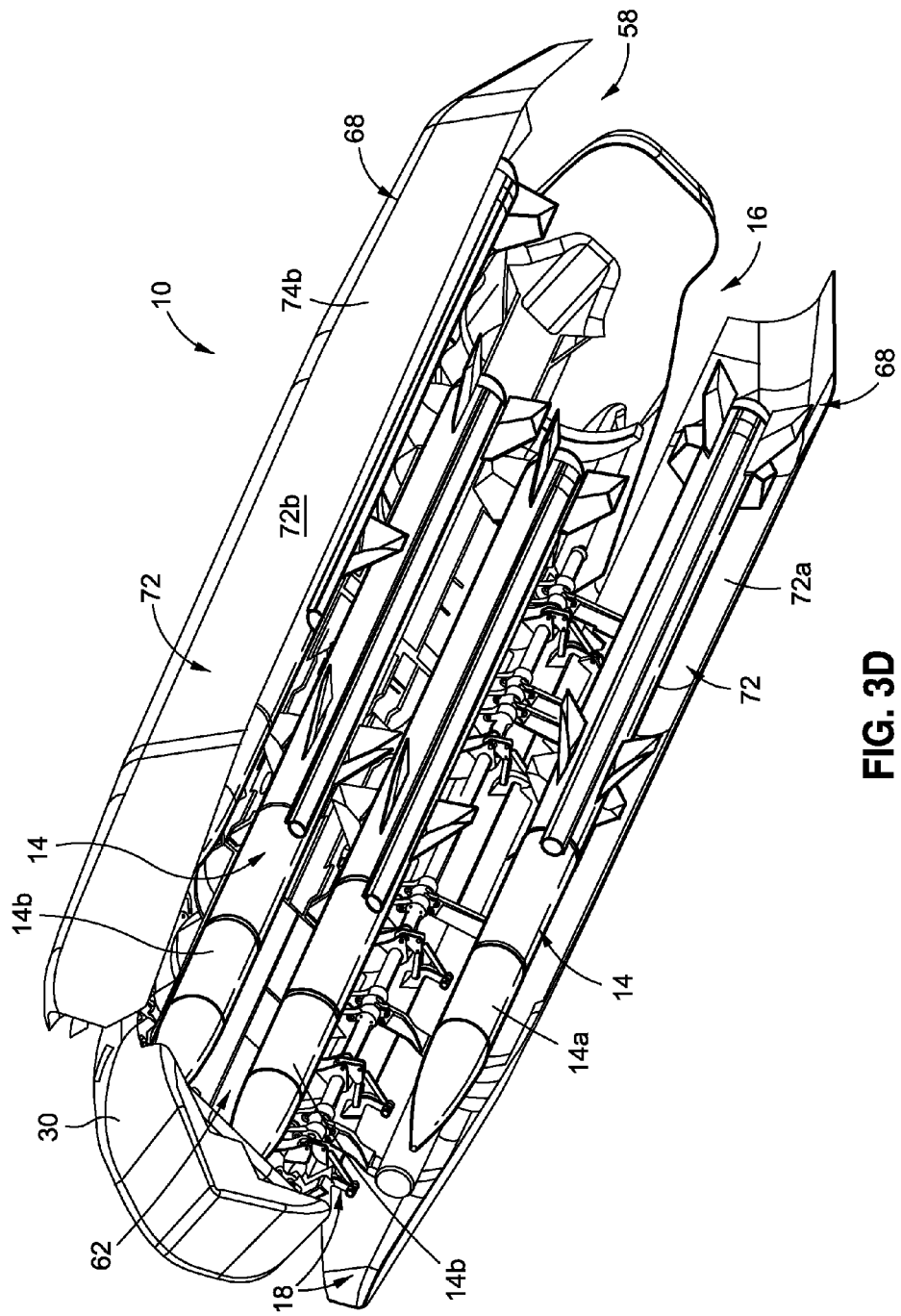
FIG. 3D is an illustration of a bottom perspective view of the pod structure of FIG. 3B in an open position showing various deployable stores housed within the pod structure.

FIG. 3D is an illustration of a bottom perspective view of the pod structure 10 of FIG. 3B in an open position 58 showing various deployable stores 14 housed within the pod structure 10. The pod housing 30 comprises a predetermined pod housing cross-sectional configuration 60 (see FIGS. 7B, 8B, 9B, 10B) optimized to provide a configurable interior volume 16 accommodating multiple different store configurations 62 (see also FIGS. 7B, 8B, 9B, 10B). The pod housing 30 further comprises a predetermined pod housing configuration 32 (see FIG. 3A) having a cross-sectional configuration 64 (see FIG. 7D, 8D, 9D, 10D) optimized to minimize a radar signature and optimized to minimize an induced aerodynamic drag. The pod structure 10 which is externally mounted provides a minimized radar signature related to deployable stores guidance system reflectance and a minimized induced aerodynamic drag or parasitic drag related to direct external attachment of deployable stores.

In addition, when the pod structure 10 is in the closed position 28 (see FIG. 3A), the pod structure 10 has an outer mold line shape (OML) 66 (see FIG. 3A) that is designed to minimize radar signature or radar cross section (RCS) and to minimize induced aerodynamic drag. The shaping of the OML 66 of the pod structure 10 is specifically designed to decrease its RCS. Additionally, unique radar absorbent coatings (not shown) may be applied to the exterior 46 (see FIG. 3A) of the pod structure 10 which may further decrease its RCS. Deployable stores 14 carried within the pod structure 10 may be shielded from target radar, which, in turn, creates a significant decrease in the aerial vehicle's overall RCS.

The OML 66 of the pod structure 10 is further preferably designed to match the induced aerodynamic drag characteristics of a similarly sized known external fuel tank (e.g., 480 gallons). Deployable stores 14 carried within the pod structure 10 preferably do not affect the aerodynamic performance of the aerial vehicle 12. The radar signature, induced aerodynamic drag, and the configurable interior volume 16 of the pod structure 10 are preferably balanced to achieve the optimum OML 66 solution. To minimize the size of the OML 66, the deployable stores 14 are preferably in a nested configuration 67 (see FIGS. 7B, 7E) such that the minimum clearances are to the main bodies 19 (see FIG. 7E) of the deployable stores 14 and not the protruding control surfaces 21 (see FIG. 7E), such as in the form of fins 21a (see FIG. 7E).

Figure 13A:
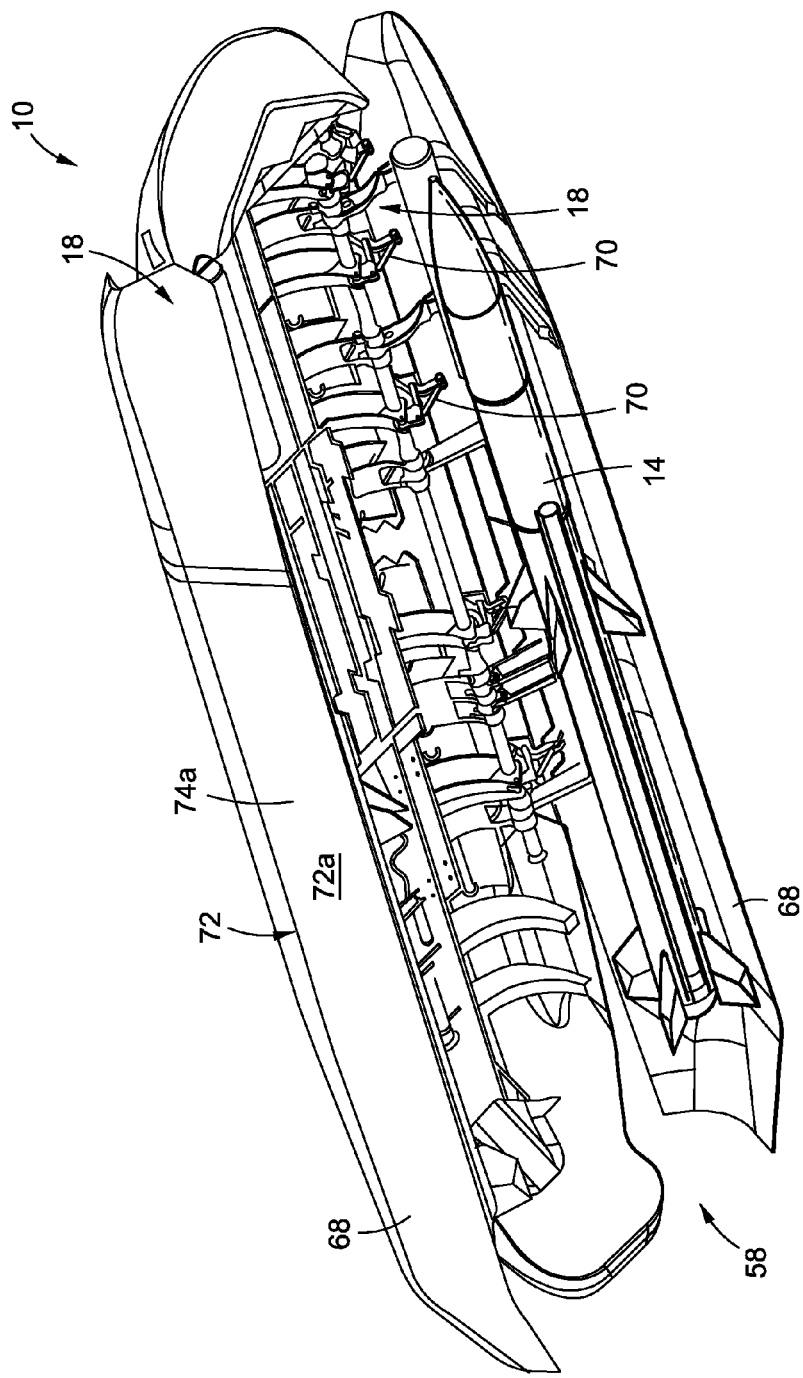
FIG. 13A is an illustration of a bottom perspective view of one of the embodiments of a pod structure of the disclosure in an open position and showing locations of seal door mechanism assemblies.
Figure 13C:
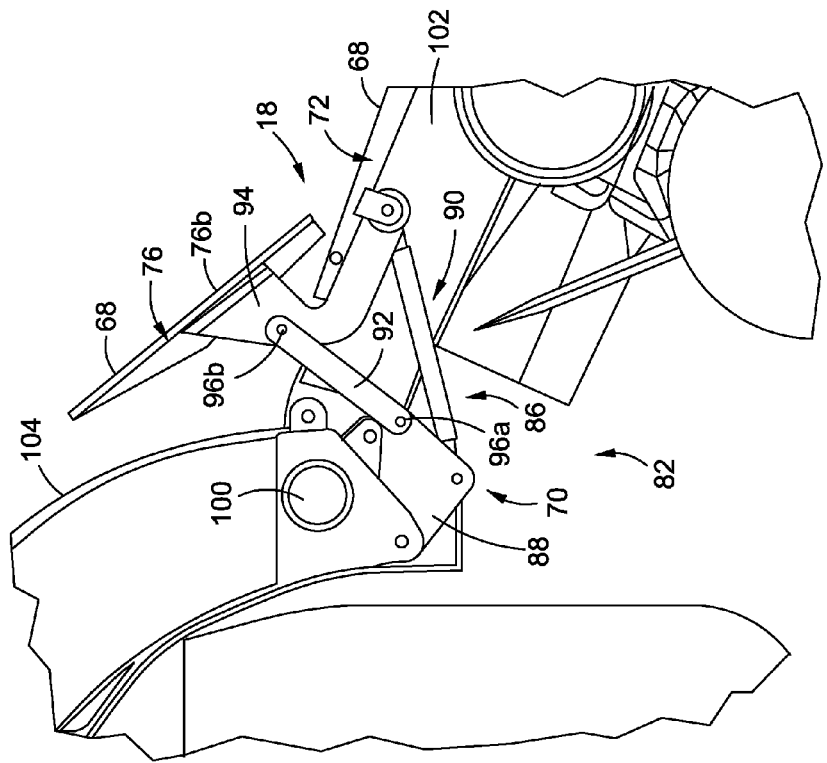
FIG. 13C is an illustration of a close-up front view of the seal door mechanism assembly of FIG. 13B in a fully open position.

As shown in FIG. 3D and FIGS. 13A-13C, the pod structure 10 further comprises a pod door assembly 18 integral with the pod housing 30 and comprising a plurality of pod doors 68 and one or more seal door mechanism assemblies 70 (see FIGS. 13a, 13C). The plurality of pod doors 68 of the pod door assembly 18 comprise at least two main doors 72 (see FIG. 3D) and preferably comprise two main doors 72 in the form of right hand main door 72a (see FIG. 3D) and left hand main door 72b (see FIG. 3D). FIG. 3D shows an exterior 74b of the left hand main door 72b, and FIG. 13A shows an exterior 74a of the right hand main door 72a. As shown in FIG. 3D, the two main doors 72 open and provide clearance for deployment of the deployable stores 14, for example, door mounted deployable stores 14a and upper mounted deployable stores 14b. The plurality of pod doors 68 of the pod door assembly 18 further comprise at least two seal doors 76 (see FIGS. 6, 13C), such as in the form of right hand seal door 76a (see FIG. 6) and left hand seal door 76b (see FIG. 13C). The pod structure 10 is preferably optimized in kinematic operational combination of the plurality of pod doors 68 and the seal door mechanism assemblies 70 (see FIGS. 13B-13C) controlling ejection launch envelopes 78 (see FIGS. 11A-11B) of the deployable stores 14 where the seal door mechanism assemblies 70 operationally linked to the plurality of pod doors 68 provide in a fully open position 86 (see FIGS. 11A-11B) a clearance independence 82 (see FIGS. 11A-11B) such that if a store ejector device 56 (see FIGS. 4, 7B) fails to deploy a deployable store 14 coupled to the store ejector device 56, no trapped deployable stores 14 occur within the pod structure 10. Preferably, there is a clearance independence 82 at a distance of about 1.00 inch between the deployable stores 14 and the OML 66.

The OML 66 (see FIG. 3A) of the pod structure 10 is preferably shaped to accommodate as many different store configurations 62 (see FIGS. 7B, 8B, 9B, 10B) as possible while still maintaining the clearance independence 82 (see FIGS. 11A-11B) to adjacent aircraft surfaces, adjacent deployable stores, take-off/landing groundlines, and other structures. The multiple different store configurations 62 (see FIGS. 7B, 8B, 9B, 10B) comprise one or more deployable stores 14 and one or more corresponding store ejector devices 56 (see FIGS. 4, 7B), such as in the form of store ejector racks 56a (see FIGS. 4, 7B), coupled to the one or more deployable stores 14. The deployable stores 14 deployed from the pod structure 10 are preferably eject launched. Each deployable store 14 has an ejection launch envelope 78 (see FIGS. 11A-11B) that is dependant on the characteristics of the deployable store's 14 store ejector device 56, such as ejection force, stroke, end of stroke velocity, and other suitable characteristics. Once the plurality of pod doors 68 reach their fully open position 86 (see FIGS. 7C, 8C, 9C, 10C), all the deployable stores 14 are clear of each other's ejection launch envelopes 78.

FIG. 13A is an illustration of a bottom perspective view of the pod structure 10 of the disclosure in an open position 58 and showing locations of the seal door mechanism assemblies 70. There are preferably five (5) seal door mechanism assemblies 70 per side that support each seal door 76 (see FIGS. 13B-13C).

Figure 13B:
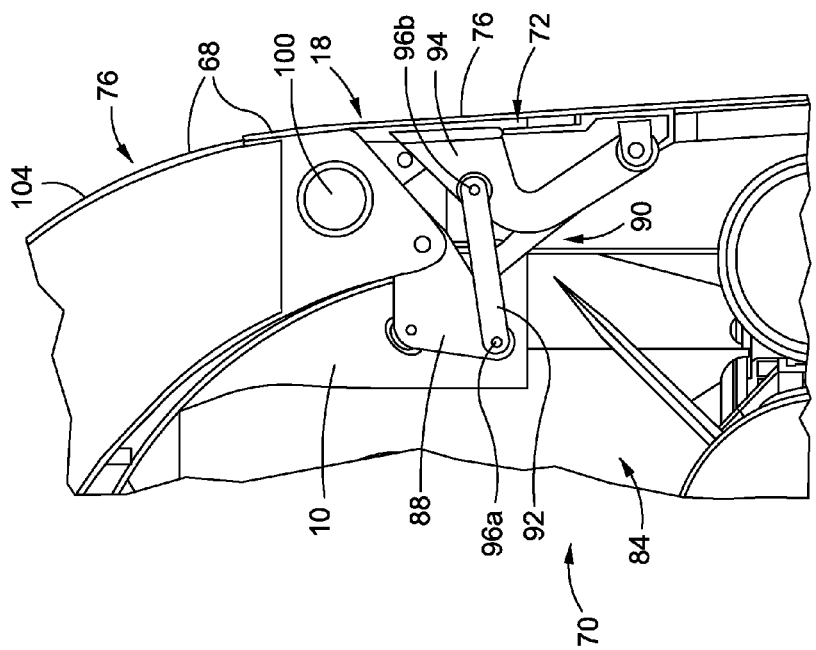
FIG. 13B is an illustration of a close-up front view of one of the embodiments of a seal door mechanism assembly of the disclosure in a fully closed position.

FIG. 13B is an illustration of a close-up front view of one of the embodiments of a seal door mechanism assembly 70 of the disclosure in a fully closed position 84. FIG. 13C is an illustration of a close-up front view of the seal door mechanism assembly 70 of FIG. 13B in a fully open position 86. As shown in FIGS. 13B-13C, each seal door mechanism assembly 70 comprises a crank element 88, an adjustable pull rod assembly 90, at least two (2) drive links 92, and at least one (1) seal door hinge fitting 94. The crank element 88 has a first portion 96a and a second portion 96b. The first portion 96a of the crank element 88 is coupled to the pod structure 10 (see FIG. 13B). The adjustable pull rod assembly 90 couples the crank element 88 to the main door 72. The drive links 92 couple the second portion 96b of the crank element 88 to the seal door hinge fitting 94. The seal door hinge fitting 94 is fixed to the seal door 76 and is driven relative to the main door 72. The motion of the seal door mechanism assembly 70 is driven by the opening of the main door 72. There is no need for a separate actuation system. As the main door 72 is driven open through rotary actuators 98 (see FIG. 4) and door drive shafts 100 (see FIGS. 13B-13C), the geometry of the seal door mechanism assembly 70 pushes the seal door 76 away from the main door 72. This allows for clearance independence 82 (see also FIGS. 11A-11B) between a main door drive fitting 102 (see FIG. 13C) and a pod structure skin 104 (see FIG. 13C) in a fully open position 86. In a fully closed position 84 (see FIG. 13B), the seal door mechanism assembly 70 holds the seal door 76 against the pod structure skin 104 and provides for proper aerodynamic and RCS compatible sealing.

13D-13H are illustrations of front cross-sectional views showing various stages of operation of the seal door mechanism assembly 70. FIG. 13D is an illustration of a front cross-sectional view of the seal door mechanism assembly 70 in the fully closed position 84. FIGS. 13E, 13F, and 13G are illustrations of front cross-sectional views of the seal door mechanism assembly 70 in intermediate open positions 106a, 106b, 106c, respectively. FIG. 13H is an illustration of a front cross-sectional view of the seal door mechanism assembly 70 in the fully open position 86.

Figure 4:
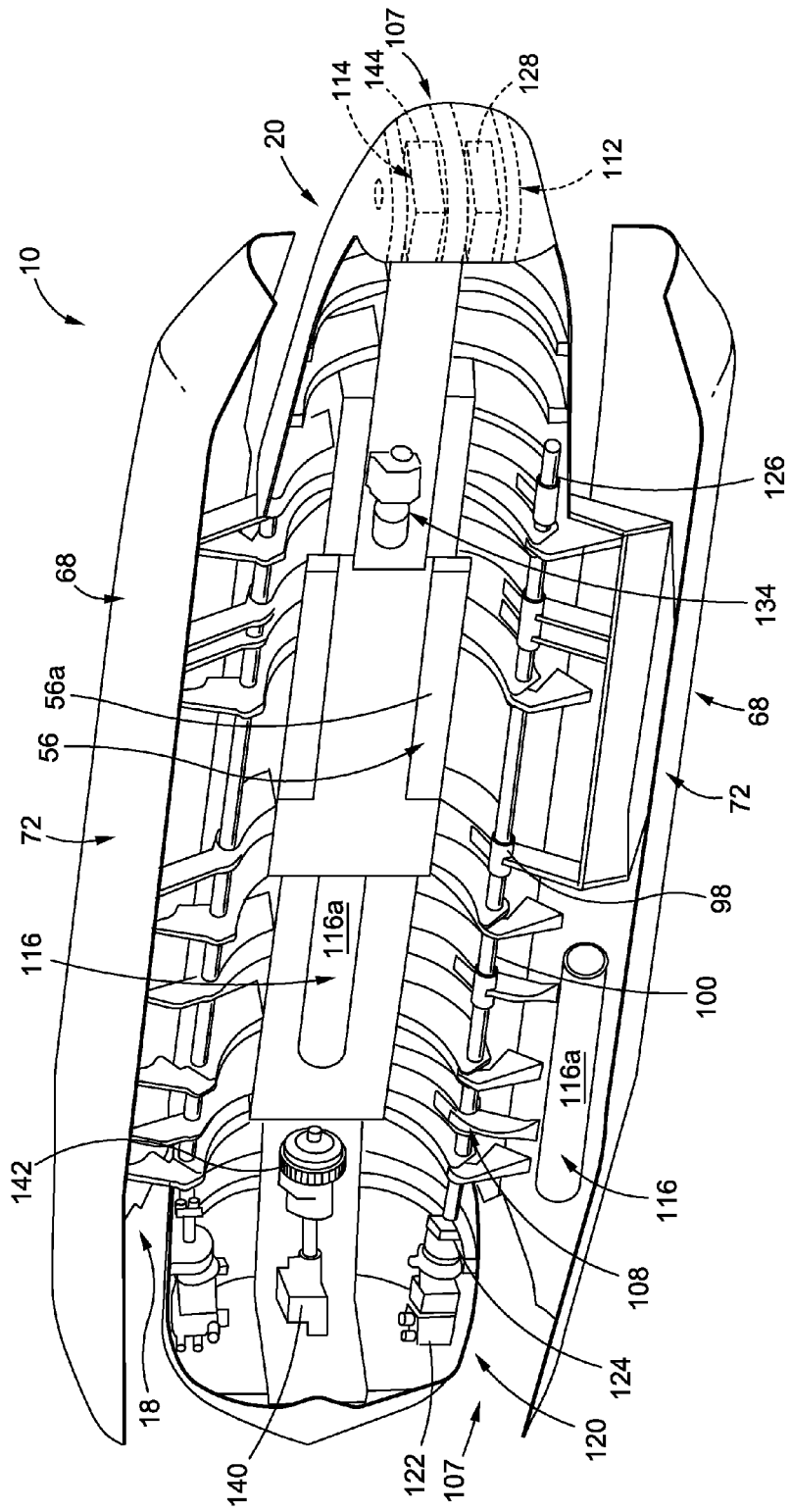
FIG. 4 is an illustration of a bottom perspective view of a pod structure of the disclosure in an open position with the deployable stores removed and showing various systems.

FIG. 4 is an illustration of a bottom perspective view of the pod showing various systems 107 of the pod structure 10 with the deployable stores removed. The pod structure 10 is preferably configured for coupling to one or more of a door drive system 108, a pneumatic compressor system 134, a control system 112, and a power system 114, preferably all housed within the pod structure 10. The systems 107 are preferably packaged into the pod structure 10 to maximize clearance independence 82 (see FIGS. 11A-11B) to the deployable stores 14 in their static position as well as their ejection launch envelopes 78. Power is preferably drawn from the electrical connector 44c (see FIG. 3A) to run the various systems 107.

FIG. 4 shows the door drive system 108. The a door drive system 108 is coupled to the pod structure 10 and is configured to drive the pod door assembly 18. The door drive system 108, as shown in FIG. 4, comprises an energy storage device 116, such as in the form of a hydraulic accumulator 116a and drive trains 120. Each drive train 120 comprises a drive unit control valve 122, a drive unit 124, one or more door drive shafts 100, one or more rotary actuators 98, and a stop module 126. The pod doors 68 are driven independently of one another through separate drive trains 120. Each of the drive trains 120 are controlled by an electronic control unit 128, such as a Pod Electronic Control Unit (PECU). The stop module 126 may be included to hold the pod doors 68 in a given position in the event of a mechanical or electrical failure of the drive train 120. The main doors 72 may carry a deployable store 14 (see FIG. 3D) which may increase the main doors' 72 overall inertia. The main door 72 open time is preferably minimized to reduce induced aerodynamic drag and radar signature impacts on the aerial vehicle 12 (see FIGS. 1-2). The short main door 72 open time and relatively high main door 72 inertia may create a significant energy requirement that the aerial vehicle 12 cannot provide quickly. As a result, an energy storage device 116, such as, for example, a hydraulic accumulator 116a, may be included in the door drive system 108. Finally, each of the drive units 124 may include a manual drive input (not shown) to allow loading of deployable stores 14 during unpowered ground operations.

FIG. 4 further shows the pneumatic compressor system 134. The pneumatic compressor system 134 is coupled to the pod structure 10 and is configured to deploy one or more deployable stores 14 (see FIG. 3D) out of the pod structure 10. The pneumatic compressor system 134 comprises one or more separate store ejector devices 56, such as in the form of store ejector racks 56a. For each store configuration 62 (see FIG. 7B), separate store ejector devices 56 may be installed. When a given deployable store 14 is to be used for a mission, its store ejector device 56 may be installed in the pod structure 10. The ability to configure the store ejector devices 56 allows for reduced overall weight of the pod structure 10. The pneumatic compressor system 134 pressurizes external air at ambient conditions, and the pressurized air is stored for use in the event of ejection of the deployable stores 14. During a given flight, the air pressure may fluctuate with altitude. The pneumatic compressor system 134 may vent and re-pressurize as needed to maintain the 5000 psi (pounds per square inch) necessary for safe separation of the deployable stores 14. The pneumatic compressor system 134 may further comprise a hydraulic reservoir 140 and a hydraulic pump 142. The pneumatic compressor system 134 including a store ejector, as disclosed in U.S. Published Patent Application 2009/0100996 A1, to Jakubowski, Jr., et al., entitled "System and Method for In-Flight Adjustment of Store Ejector Gas Flow Orificing", incorporated herein by reference in its entirety, may be used with the pod structure 10 disclosed herein.

As shown in FIG. 4, the control system 112 is coupled to the pod structure 10 and is configured to control operation and deployment of the one or more deployable stores 14. The control system 112 preferably comprises the electronic control unit 128 (see FIG. 4), such as in the form of a Pod Electronic Control Unit (PECU), a computer (not shown), and a logical interface (not shown) between the configurable store stowage and deployment system 20 and a management system (not shown) on the aerial vehicle 12 (see FIG. 1) for managing the one or more deployable stores 14. The Pod Electronic Control Unit (PECU) controls internal functions of the pod structure 10. The Pod Electronic Control Unit (PECU) and the power system 114 control the electrical functions of the pod structure 10.

As shown in FIG. 4, the power system 114 is coupled to the pod structure 10 and is configured to provide power to the pod structure 10 and the configurable store stowage and deployment system 20. The power system 114 comprises an electrical power system 144 (see FIG. 4), such as in the form of an electrical power supply. The electrical power supply may comprise an AC/DC converter that converts AC (alternating current) power of the aerial vehicle 12 into DC (direct current) of the pod structure 10 and the configurable store stowage and deployment system 20 for use in the door drive system 108, the pneumatic compressor system 134, and the one or more deployable stores 14.

Figure 6:
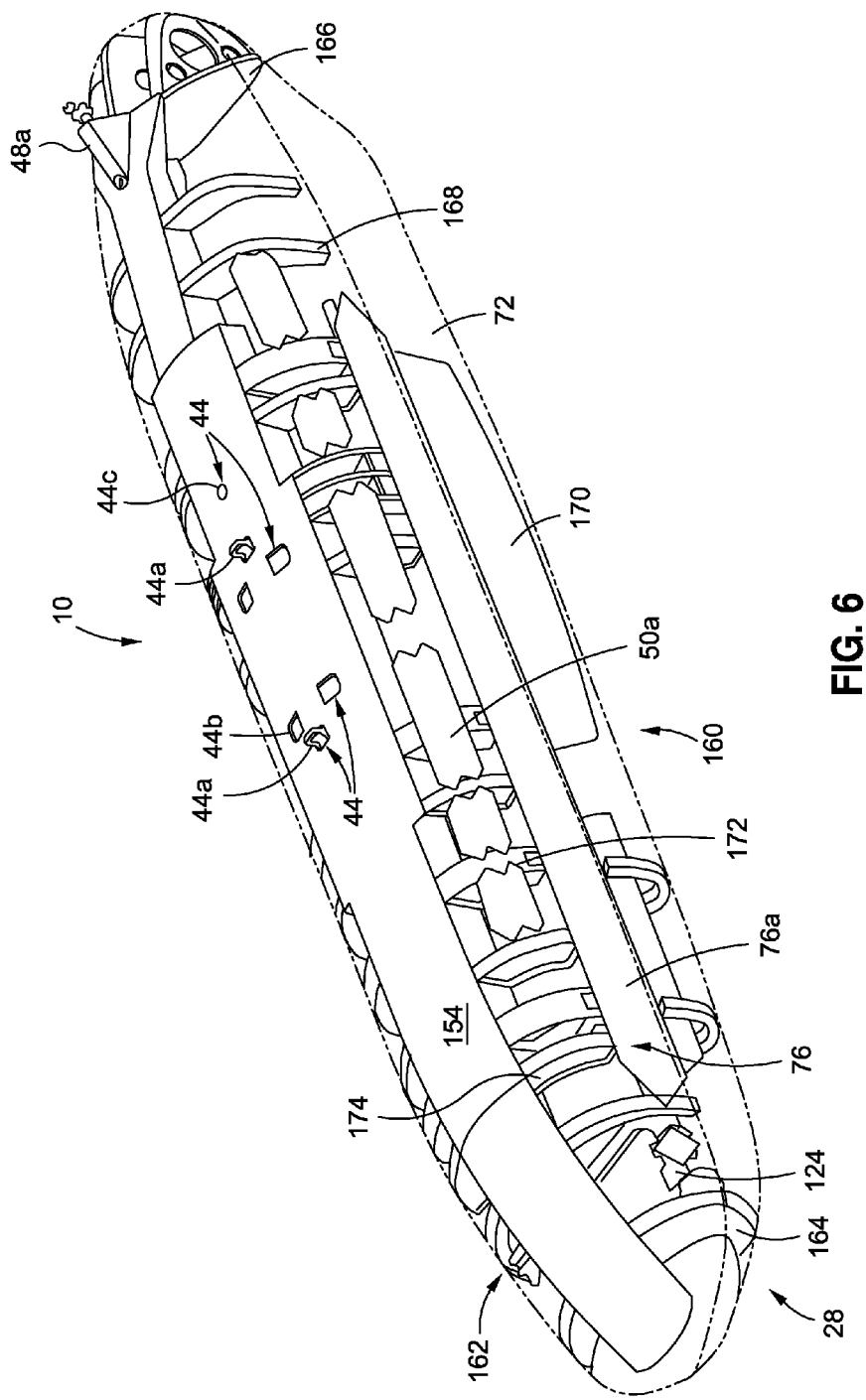
FIG. 6 is an illustration of a top side perspective view of a pod structure of the disclosure in a closed position and showing a structural assembly.

FIG. 6 is an illustration of a top side perspective view of the pod structure 10 of the disclosure in the closed position 28 and showing a structural assembly 160. FIG. 6 shows the interface elements 44, such as in the form of lugs 44a, swaybrace pads 44b, and electrical connector 44c, the pivot post 48a, the upper access doors 50a, the main door 72, the seal door 76, the drive units 124, the strongback portion 154, a forward upper beam 162, a forward bulkhead 164, an aft bulkhead 166, an aft frame 168, a main door beam 170, a rotary actuator module frame 172, and a seal door mechanism assembly frame 174.

FIGS. 7A-10E show various embodiments of the store configurations 62 in the configurable interior volume 16. However, the pod structure 10 and the configurable store stowage and deployment system 20 are not limited to these store configurations 62 and other suitable store configurations 62 may be used. One or more deployable stores 14 are preferably mounted on the two main doors 72. Two or more deployable stores 14 are preferably mounted in a nested configuration within the configurable interior volume 16 of the pod structure 10.

FIG. 7A is an illustration of a side view of one of the embodiments of the pod structure 10 of the disclosure. FIG. 7B is an illustration of a cross-sectional view taken along lines 7B-7B of FIG. 7A showing a first embodiment of a store configuration 62a in the configurable interior volume 16 of the pod structure 10 and showing both the pod door assembly 18 and the seal door mechanism assembly 70 in a fully closed position 84. FIG. 7C is an illustration of a cross-sectional view of the first embodiment of the store configuration 62a of FIG. 7B showing both the pod door assembly 18 and the seal door mechanism assembly 70 in a fully open position 86. FIG. 7D is an illustration of a top view of the pod structure 10 of FIG. 7A showing the store configuration 62a of deployable stores 14 in phantom lines. FIG. 7E is an illustration of a side view of the pod structure of FIG. 7D showing the store configuration 62a of the deployable stores 14 in phantom lines. FIGS. 7B-7E show the store configuration 62a having four (4) deployable stores 14. As shown in FIG. 7C, the four (4) deployable stores 14 may comprise two (2) door mounted deployable stores 14a, such as air-to-air missiles 15a, attached to their respective store ejector racks 56a, and two (2) upper mounted deployable stores 14b, such as air-to-ground bombs 15b, attached to their respective store ejector racks 56a.

FIG. 8A is an illustration of a side view of the pod structure 10 of the disclosure similar to the pod structure 10 of FIG. 7A. FIG. 8B is an illustration of a cross-sectional view taken along lines 8B-8B of FIG. 8A showing a second embodiment of a store configuration 62b in the configurable interior volume 16 of the pod structure 10 and showing both the pod door assembly 18 and the seal door mechanism assembly 70 in a fully closed position 84. FIG. 8C is an illustration of a cross-sectional view of the second embodiment of the store configuration 62b of FIG. 8B showing both the pod door assembly 18 and the seal door mechanism assembly 70 in a fully open position 86. FIG. 8D is an illustration of a top view of the pod structure 10 of FIG. 8A showing the store configuration 62b of deployable stores 14 in phantom lines. FIG. 8E is an illustration of a side view of the pod structure of FIG. 8D showing the store configuration 62b of the deployable stores 14 in phantom lines. FIGS. 8B-8E show the store configuration 62b having six (6) deployable stores 14. As shown in FIG. 8C, the six (6) deployable stores 14 may comprise two (2) door mounted deployable stores 14a, such as air-to-air missiles 15a, attached to their respective store ejector racks 56a, and four (4) upper mounted deployable stores 14b, such as small diameter air-to-ground bombs 15c, attached to their respective store ejector racks 56a.

FIG. 9A is an illustration of a side view of one of the embodiments of a pod structure of the disclosure similar to the pod structure of FIGS. 7A and 8A. FIG. 9B is an illustration of a cross-sectional view taken along lines 9B-9B of FIG. 9A showing a third embodiment of a store configuration 62c in the configurable interior volume 16 of the pod structure 10 and showing both the pod door assembly 18 and the seal door mechanism assembly 70 in a fully closed position 84. FIG. 9C is an illustration of a cross-sectional view of the third embodiment of the store configuration 62c of FIG. 9B showing both the pod door assembly 18 and the seal door mechanism assembly 70 in a fully open position 86. FIG. 9D is an illustration of a top view of the pod structure 10 of FIG. 9A showing the store configuration 62c of deployable stores 14 in phantom lines. FIG. 9E is an illustration of a side view of the pod structure of FIG. 9D showing the store configuration 62c of the deployable stores 14 in phantom lines. FIGS. 9B-9E show the store configuration 62c having four (4) deployable stores 14. As shown in FIG. 9C, the four (4) deployable stores 14 may comprise two (2) door mounted deployable stores 14a, such as air-to-air missiles 15a, attached to their respective store ejector racks 56a, and two (2) upper mounted deployable stores 14b, such as air-to-air missiles 15a, attached to their respective store ejector racks 56a.

FIG. 10A is an illustration of a side view of one of the embodiments of a pod structure of the disclosure similar to the pod structure of FIGS. 7A, 8A, and 9A. FIG. 10B is an illustration of a cross-sectional view taken along lines 10B-10B of FIG. 10A showing a fourth embodiment of a store configuration 62d in the configurable interior volume 16 of the pod structure 10 and showing both the pod door assembly 18 and the seal door mechanism assembly 70 in a fully closed position 84. FIG. 10C is an illustration of a cross-sectional view of the fourth embodiment of the store configuration 62d of FIG. 10B showing both the pod door assembly 18 and the seal door mechanism assembly 70 in a fully open position 86. FIG. 10D is an illustration of a top view of the pod structure 10 of FIG. 10A showing the store configuration 62d of the deployable store 14 in phantom lines. FIG. 10E is an illustration of a side view of the pod structure 10 of FIG. 10D showing the store configuration 62d of the deployable store 14 in phantom lines. FIGS. 10B-10E show the store configuration 62d having one (1) deployable store 14. As shown in FIG. 10C, the one (1) deployable store 14 may comprise one (1) upper mounted deployable store 14b, such as a large air-to-ground bomb 15d, attached to its respective store ejector rack 56a.

The pod structure 10 is designed such that the structural assembly 160 (see FIG. 6), the pod door assembly 18 (see FIGS. 4, 13A), the door drive system 108 (see FIG. 4), the control system 112 (see FIG. 4), and the pneumatic compressor system 134 (see FIG. 4) are the same for all store configurations 62, 62a-62d (see FIGS. 7B-10B). These store configurations 62, 62a-62d (see FIGS. 7B-10B), also referred to as store loadouts, may be configured for air-to-ground only, air-to-air only, or a combination of the two depending on the requirements of a certain mission. Possible store configurations 62, 62a-62d may comprise but are not limited to two (2) GBU-38/-54 500 lbs. air-to-ground bomb and two (2) AIM-120C air-to-air missiles (see FIG. 7B); four (4) GBU-39 small diameter bombs and two (2) AIM-120C air-to-air missiles (see FIG. 8B); four (4) AIM-120C air-to-air missiles (see FIG. 9B); one (1) BLU-109 (or GBU-31) 2,000 lbs. air-to-ground bomb (see FIG. 10B); one (1) GBU-32 1,000 lbs. air-to-ground bomb; one (1) extended range (ER) 2,000 lbs. air-to-ground bomb; one (1) joint standoff weapon (JSOW); one (1) joint standoff missile (JSM), or a combination thereof or another suitable store configuration 62. As discussed above, the same pod structure 10 may be configured with any of these store configurations 62. The only change to the pod structure 10 will be to install the necessary store ejector devices 56 and other suitable store suspension equipment for a given deployable store 14.

Figure 11A:
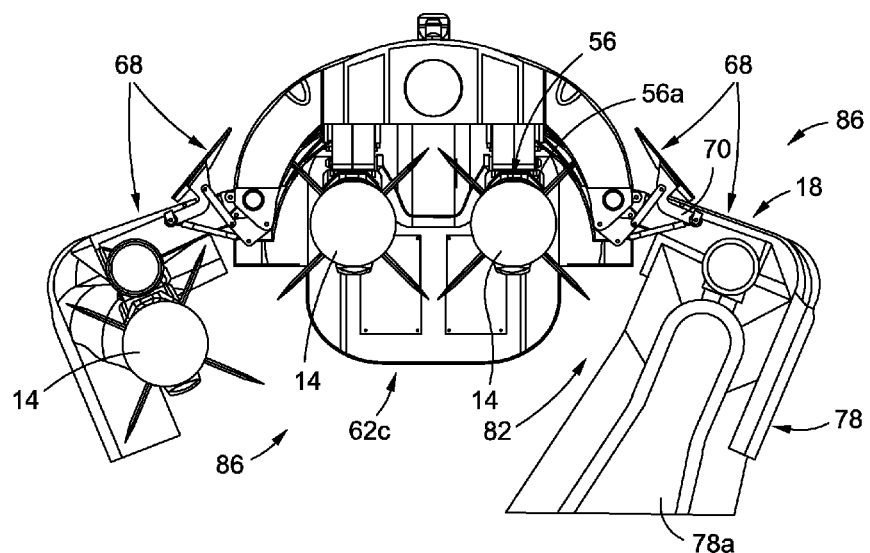
FIG. 11A is an illustration of the third embodiment of the store configuration of FIG. 9C with the pod door assembly in an open position and showing a door mounted ejection envelope.
Figure 11B:
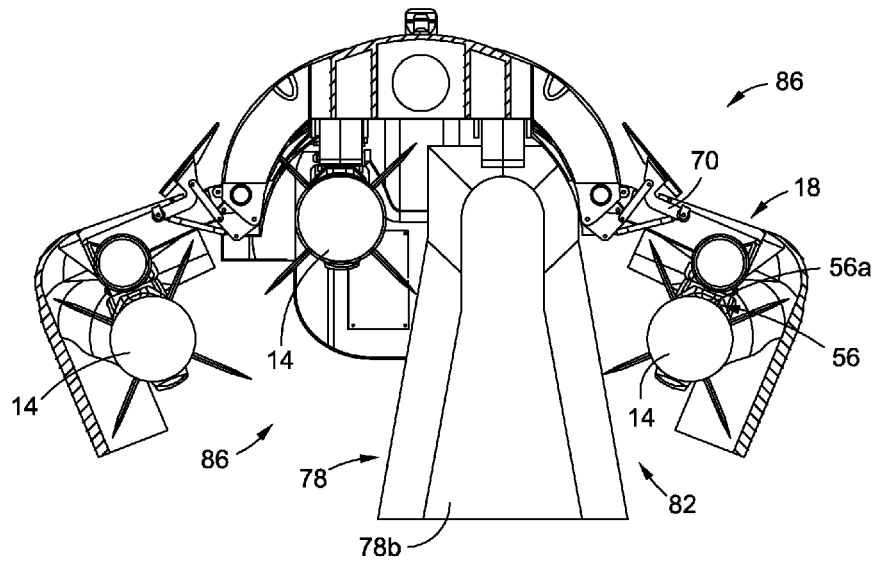
FIG. 11B is an illustration of the third embodiment of the store configuration of FIG. 11A with the pod door assembly in an open position and showing an upper mounted ejection envelope.

FIG. 11A is an illustration the store configuration 62c of FIG. 9C with both the pod door assembly 18 and the seal door mechanism assembly 70 in a fully open position 86 and showing an ejection launch envelope 78 in the form of a door mounted ejection launch envelope 78a. FIG. 11B is an illustration of the third embodiment of the store configuration 62c of FIG. 11A with both the pod door assembly 18 and the seal door mechanism assembly 70 in a fully open position 86 and showing an ejection launch envelope 78 in the form of an upper mounted ejection launch envelope 78b. FIGS. 11A-11B show the clearance independence 82 of the ejection launch envelopes 78 which is important for mission performance of the pod structure 10. In the event that one store ejector device 56, such as in the form of store ejector rack 56a, fails to eject a given deployable store 14, the other deployable stores 14 within the pod structure 10 may still be utilized. There are no trapped deployable stores 14 in the pod structure 10.

Figure 12C:
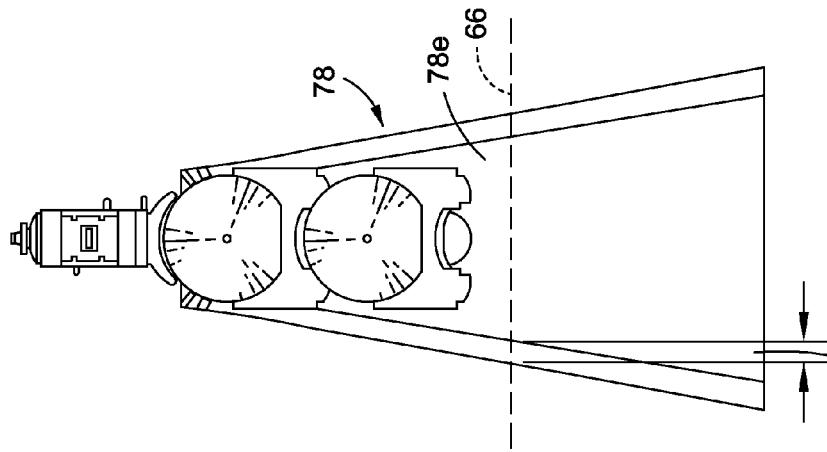
FIG. 12C is an illustration of a front view of an ejection launch envelope overlay used in one of the embodiments of a pod structure of the disclosure.
Figure 12B:
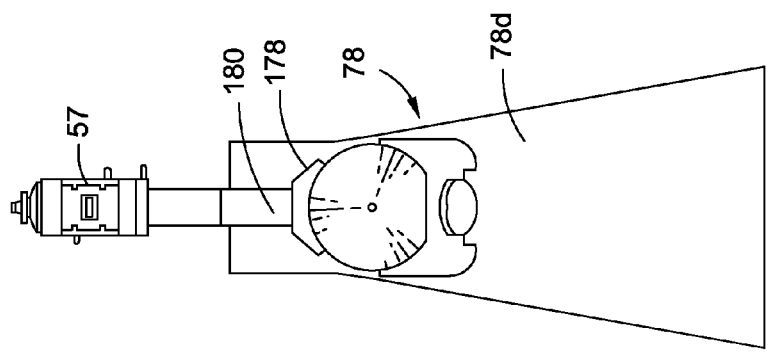
FIG. 12B is an illustration of a front view of a constrained release ejection envelope having swaybraces attached to an ejector piston and an ejector housing.
Figure 12A:
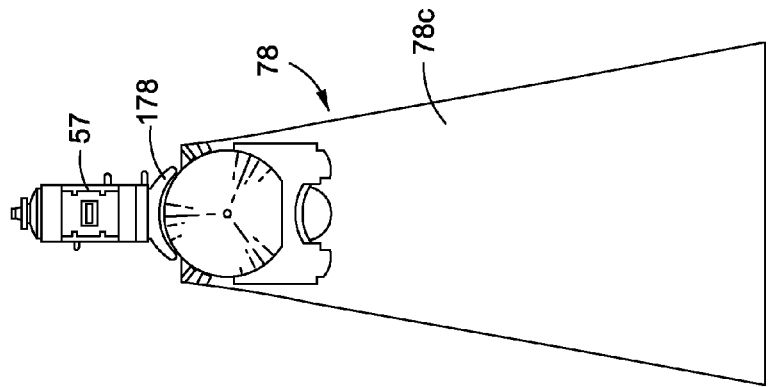
FIG. 12A is an illustration of a front view of an ejection envelope having swaybraces attached to an ejector housing.

FIGS. 12A-12C show various ejection launch envelopes 78. FIG. 12A is an illustration of a front view of an ejection launch envelope 78 having a swaybrace element 178 attached to an ejector housing unit 57 which is a standard ejection launch envelope 78c. FIG. 12B is an illustration of a front view of an ejection launch envelope 78 in the form of a constrained release ejection launch envelope 78d having swaybrace elements 178 attached to an ejector piston 180 and the ejector piston 180 is then attached to the ejector housing unit 57. The constrained release ejection launch envelope 78d shown in FIG. 12B, is disclosed in U.S. Pat. No. 5,904,323, to Jakubowski, Jr., et al., entitled "Constrained Store Release System", which is incorporated herein by reference in its entirety. FIG. 12C is an illustration of ejection launch envelopes 78 in the form of an ejection launch envelope overlay 78e that may be used in the pod structure 10 of the disclosure. The ejection launch envelope overlay 78c provides an increased clearance independence 82 at the outer mold line 66. This constrained release envelope allows for tighter store stowed and deployment clearances and an small overall pod envelope.

In another embodiment of the disclosure, there is provided a radar signature minimizing and induced aerodynamic drag minimizing, externally mountable, internally configurable store stowage and deployment system 20 (see FIG. 4) for an aerial vehicle 12. The configurable store stowage and deployment system 20 comprises the pod structure 10 which is externally mountable and internally configurable and configured for mounting to an aerial vehicle 12. As discussed in detail above, the pod structure 10 comprises a pod housing 30 which is externally mountable. The pod housing 30 comprises a predetermined pod housing cross-sectional configuration 60 optimized to provide a configurable interior volume 16 accommodating multiple different store configurations 62 (see FIGS. 7A-10E). The pod housing 30 further comprises a predetermined pod housing configuration 32 having a cross-sectional configuration 64 optimized to minimize a radar signature and optimized to minimize an induced aerodynamic drag. As discussed above, the pod structure 10 further comprises a pod door assembly 18 integral with the pod housing 30 and comprising a plurality of pod doors 68 and one or more seal door mechanism assemblies 70 (see FIGS. 13A-13C). The pod structure 10 is preferably optimized in kinematic operational combination of the plurality of pod doors 68 and seal door mechanism assemblies 70 controlling ejection launch envelopes 78 (see FIGS. 11A-11B), where the seal door mechanism assemblies 70 operationally linked to the plurality of pod doors 68 provide in a fully open position 86 (see FIGS. 11A-11B) a clearance independence 82 (see FIGS. 11A-11B), such that if a store ejector device 56 fails to deploy a deployable store 14 coupled to the store ejector device 56, no trapped deployable stores 14 occur within the pod structure 10.

The configurable store stowage and deployment system 20 further comprises a door drive system 108 (see FIG. 4), discussed above, coupled to the pod structure 10 and configured to drive the pod door assembly 18. The configurable store stowage and deployment system 20 further comprises a pneumatic compressor system 134 (see FIG. 4), discussed above, coupled to the pod structure 10 and configured to deploy one or more deployable stores 14 out of the pod structure 10. The configurable store stowage and deployment system 20 further comprises a control system 112 (see FIG. 4), discussed above, coupled to the pod structure 10 and configured to control operation and deployment of the one or more deployable stores 14. The configurable store stowage and deployment system 20 further comprises a power system 114 (see FIG. 4), discussed above, coupled to the pod structure 10 and configured to provide power to the configurable store stowage and deployment system 20.

Figure 15:
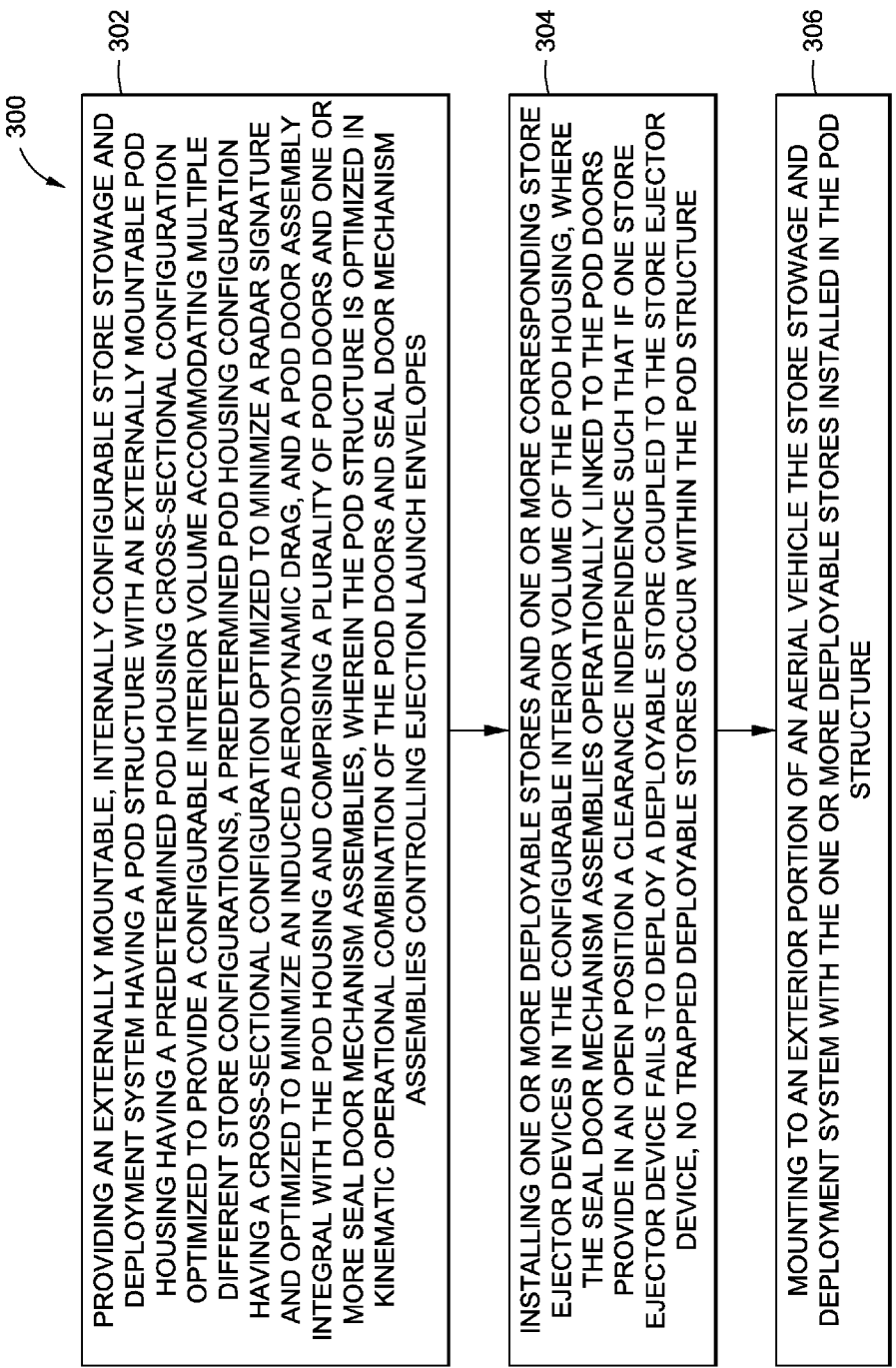

In another embodiment of the disclosure, there is provided a method 300 for minimizing radar signature and induced aerodynamic drag and for optimizing the configurable store volume 16, such as an interior store volume 17, of an externally mountable configurable store stowage and deployment system 20 on an aerial vehicle 12. FIG. 15 is a flow diagram illustrating an exemplary embodiment of the method 300 of the disclosure.

As shown in FIG. 15, the method 300 comprises step 302 of providing an externally mountable, internally configurable store stowage and deployment system 20 having a pod structure 10. As discussed above, the pod structure 10 comprises a pod housing 30 that is externally mountable. The pod housing 30 comprises a predetermined pod housing cross-sectional configuration 60 optimized to provide a configurable interior volume 16 accommodating multiple different store configurations 62 (see FIGS. 7A-10E). The pod housing 30 further comprises a predetermined pod housing configuration 32 having a cross-sectional configuration 64 optimized to minimize a radar signature and optimized to minimize an induced aerodynamic drag. As discussed above, the pod structure 10 further comprises a pod door assembly 18 integral with the pod housing 30 and comprising a plurality of pod doors 68 and one or more seal door mechanism assemblies 70 (see FIGS. 13A-13C). The pod structure 10 is preferably optimized in kinematic operational combination of the plurality of pod doors 68 and seal door mechanism assemblies 70 controlling ejection launch envelopes 78 (see FIGS. 11A-11B). The pod structure 10 is preferably configured for coupling to one or more of a door drive system 108, a pneumatic compressor system 134, a control system 112, and a power system 114.

As shown in FIG. 15, the method 300 further comprises step 304 of installing one or more deployable stores 14 and one or more corresponding store ejector devices 56 in the configurable interior volume 16 of the pod housing 30, where the seal door mechanism assemblies 70 operationally linked to the plurality of pod doors 68 provide in a fully open position 86 (see FIGS. 11A-11B) a clearance independence 82 (see FIGS. 11A-11B), such that if a store ejector device 56 fails to deploy a deployable store 14 coupled to the store ejector device 56, no trapped deployable stores 14 occur within the pod structure 10.

As shown in FIG. 15, the method 300 further comprises step 306 of mounting to an exterior portion 11 (see FIG. 1) of an aerial vehicle 12 (see FIG. 1) the configurable store stowage and deployment system 20 with the one or more deployable stores 14 installed in the pod structure 10. The method 300 may further comprise reconfiguring the configurable interior volume 16 of the pod housing 30 with a different store configuration 62. The method 300 may further comprise reusing the configurable store stowage and deployment system 20 with a same aerial vehicle 12 or a different aerial vehicle 12.

Figure 14:
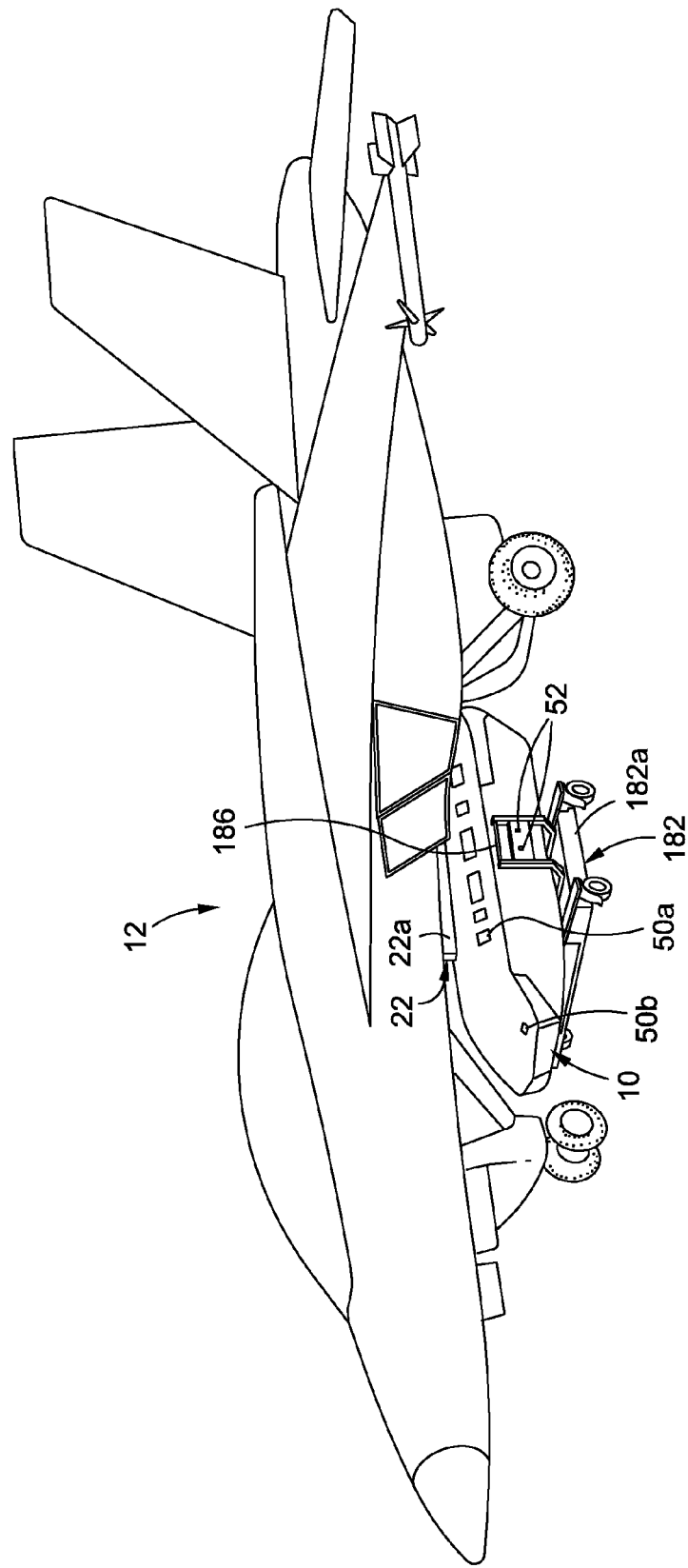
FIG. 14 is an illustration of a side perspective view of one of the embodiments of a pod structure loaded on a movable apparatus in preparation for mounting to a centerline pylon on an aerial vehicle; and, FIG. 15 is a flow diagram illustrating an exemplary embodiment of a method of the disclosure.

Prior to a given mission, the deployable stores 14 and store ejector devices 56 that are required for the mission are installed into the pod structure 10. To accomplish this, the pod structure 10 (see FIG. 3C) may be hoisted onto an elevated fixture (not shown). The upper access doors 50a and the manual door drive access doors 50b (see FIG. 3C) may be opened and may be manually driven to their open positions 54 (see FIG. 3C) showing open position 54 of upper access doors 50a). At this point the store ejector devices 56 (see FIG. 4) may be installed and prepared for upload of the deployable stores 14 through the upper access doors 50a (see FIG. 3C). The deployable stores 14 are preferably positioned under the pod structure 10 and hoisted onto the store ejector racks 56 (see FIG. 4). The deployable stores 14 may then be safed and swaybraced. When all internal ground operations involving the pod structure 10 are complete, the main doors 72 (see FIG. 3C) may be manually closed and the pod structure 10 may be lowered onto a movable apparatus 182 (see FIG. 14), such as a transportation dolly 182a. FIG. 14 is an illustration of a side perspective view of one of the embodiments of the pod structure 10 loaded on the movable apparatus 182, such as in the form of the transportation dolly 182a, in preparation for mounting of the pod structure 10 to the pylon 22, such as the centerline pylon 22a, on an aerial vehicle 12. The transportation dolly 182a has a cradle portion 186 to hold the pod structure 10.

During its mission, the aerial vehicle 12 may command release or deployment of the deployable stores 14 to the configurable store stowage and deployment system 20 (see FIG. 4). This command may preferably be relayed through the PECU (see FIG. 4) to the various systems 107. When the plurality of pod doors 68 are commanded to open, the deployable stores 14 to be ejected are powered-up. When the plurality of pod doors 68 and the seal door mechanism assemblies 70 reach their fully open position 86 (see FIG. 13H), the store ejector devices 56 unlock and the deployable stores 14 are ejected. Once the deployable stores 14 are clear of the pod structure 10 and the configurable store stowage and deployment system 20, the plurality of pod doors 68 doors are commanded to close and the aerial vehicle 12 continues its mission.

In the event of a deployable store 14 that is hung or in the event of failure of the store ejector device 56, the other deployable stores 14 in the pod structure 10 are still able to be employed. Deployable stores 14 that are door mounted deployable stores 14a (see FIG. 7C) rotate clear of the upper mounted deployable stores 14b (see FIG. 7C). If either or both of the door mounted deployable stores 14a are unable to be ejected, the upper mounted deployable stores 14b can still be deployed. Additionally, all of the upper mounted deployable stores 14b have sufficient clearance independence 82 to each other. Failure of any store ejector device 56 will not result in the other deployable stores 14 being trapped in the pod structure 10.

Disclosed embodiments of the pod structure 10, the configurable store stowage and deployment system 20, and method 300 provide numerous advantages over known devices, systems, and methods. Disclosed embodiments of the pod structure 10, the configurable store stowage and deployment system 20, and method 300 use an internally configurable pod structure 10 that provides the flexibility to use a variety of deployable stores (e.g., air-to-air, air-to-ground, etc.) and multiple different store configurations 62 without having to change or construct a different pod structure with each internal reconfiguration. The pod structure 10 provides an exterior with a uniform outside structure and provides an interior with multiple internal store configurations. The structure, mechanisms, and systems are preferably the same regardless of the desired store configuration chosen.

In addition, disclosed embodiments of the pod structure 10, the configurable store stowage and deployment system 20, and method 300 provide greater flexibility to existing fleet aircraft. The pod structure 10 encloses the deployable stores 14 for radar signature reduction and can then be mounted on existing pylons 22 of aerial vehicles 12 and other aircraft. This creates an externally carried internal weapons bay that can be easily installed onto and removed from existing fleet aircraft. The existing, high performance fleet aircraft may now be able to perform missions that require stealth capabilities. The pod structure 10 may be loaded on a strike aircraft or aerial vehicle when air defenses are active. When the need for stealth is no longer needed, the pod structure 10 may be removed and the strike aircraft or aerial vehicle may be reconfigured to a typical external store carriage. Many of the stealthy and non-stealthy aircraft produced could use the pod structure 10 for additional mission capability. Moreover, the pod structure 10 may be used to increase the store configuration 62 or loadout of existing stealth aircraft.

In addition, disclosed embodiments of the pod structure 10, the configurable store stowage and deployment system 20, and method 300 preferably minimize or reduce a radar signature and induced aerodynamic drag and are optimized for internal placement of one or more deployable stores through configuration and optimal kinematic operation of a pod door assembly. The deployable stores 14 are preferably stowed and carried in the configurable interior volume 16 of the pod structure 10, which significantly reduces the impact to the radar signature of the aerial vehicle 12 typically caused by existing external store carriage systems. The pod structure 10 has an outer mold line (OML) 66 and applied coatings are preferably optimized to provide a configurable interior volume accommodating multiple different store configurations, and optimized to minimize a radar signature and to minimize an induced aerodynamic drag. The OML 66 of the pod structure 10 may be designed to match the drag characteristics of a similarly sized external fuel tank (480 gallons), and deployable stores 14 carried within the pod structure 10 preferably do not affect the aerodynamic performance of the aerial vehicle 12.

Further, the deployable stores 14 are preferably arranged within the configurable interior volume 16 in a nested configuration 67, and due to the store configuration 62 and optimal kinematic operation of a pod door assembly 18, which includes a novel seal door mechanism assembly 70, when the pod door assembly 18 is opened, there is sufficient clearance independence 82 such that if a store ejector device 56 fails to deploy a deployable store 14 coupled to the store ejector device 56, no trapped deployable stores 14 occur within the pod structure 10. Thus, the deployable stores 14 may all be separately ejected without interference from the other deployable stores 14.

In addition, disclosed embodiments of the pod structure 10, the configurable store stowage and deployment system 20, and method 300 provide a pod structure 10 that is reusable and designed for more than only a one-time use.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. An externally mountable pod structure comprising:
   an externally mountable pod housing comprising:
      a configurable interior volume configured to contain one or more deployable stores;
      a pod housing configuration having a cross-sectional configuration optimized to minimize a radar signature and optimized to minimize an induced aerodynamic drag; and,
      a pod door assembly integral with the pod housing and comprising a plurality of pod doors comprising at least two main doors and at least two seal doors, and further comprising one or more seal door mechanism assemblies, each seal door mechanism assembly coupling each main door to each seal door, and coupling each main door and each seal door to the pod structure, and when each seal door mechanism assembly is in a closed position, each seal door mechanism assembly holds each seal door against a pod structure skin, wherein the seal door mechanism assemblies operationally linked to the pod doors provide in an open position a clearance independence such that if a store ejector device fails to deploy the one or more deployable stores coupled to the store ejector device, no trapped deployable stores occur within the pod structure.

2. The pod structure of claim 1 wherein the one or more deployable stores comprise a missile, an aerodynamic missile, an air to air missile, an aerial bomb, an air to ground bomb, an extended range air to ground bomb, a small diameter bomb, a miniature aerial vehicle, an unmanned aerial vehicle, a drone, a joint standoff weapon, a joint standoff missile, a micro-satellite, a multi-payload airborne store comprising an expendable electronic counter measure dispenser and a tactical reconnaissance assembly, or a combination thereof.

3. The pod structure of claim 1 further comprising one or more interface elements coupled to an exterior of the pod structure and configured to interface and aid in external mounting of the pod structure to an exterior portion of an aerial vehicle.

4. The pod structure of claim 3 wherein one pod structure is mounted to a centerline pylon on the aerial vehicle.

5. The pod structure of claim 3 wherein one pod structure is mounted to a mid-board pylon under each of two wings of the aerial vehicle.

6. The pod structure of claim 3 further comprising a jettison element coupled to the pod structure and configured to jettison the pod structure from the aerial vehicle.

7. The pod structure of claim 1 wherein each seal door mechanism assembly comprises a crank element coupled to the pod structure, an adjustable pull rod assembly coupled between the crank element and a main door of the pod door assembly, at least one seal door hinge fitting coupled to a seal door of the pod door assembly, and at least two drive links coupling the crank element to the at least one seal door hinge fitting.

8. The pod structure of claim 1 wherein the multiple different store configurations comprise one or more deployable stores and one or more corresponding store ejector devices coupled to the one or more deployable stores.

9. The pod structure of claim 1 wherein the pod structure is configured for coupling to one or more of a door drive system, a pneumatic compressor system, a control system, and a power system.

10. A configurable store stowage and deployment system for an aerial vehicle, the system comprising:
    an externally mountable, internally configurable pod structure configured for mounting to the aerial vehicle, the pod structure comprising:
       an externally mountable pod housing comprising:
          a configurable interior volume configured to contain one or more deployable stores;
          a pod housing configuration having a cross-sectional configuration optimized to minimize a radar signature and optimized to minimize an induced aerodynamic drag; and,
       a pod door assembly integral with the pod housing and comprising a plurality of pod doors comprising at least two main doors and at least two seal doors, and further comprising one or more seal door mechanism assemblies, each seal door mechanism assembly coupling each main door to each seal door, and coupling each main door and each seal door to the pod structure, and when each seal door mechanism assembly is in a closed position, each seal door mechanism assembly holds each seal door against a pod structure skin, wherein the seal door mechanism assemblies operationally linked to the pod doors provide in an open position a clearance independence such that if a store ejector device fails to deploy the one or more deployable stores coupled to the store ejector device, no trapped deployable stores occur within the pod structure;
    a door drive system coupled to the pod structure and configured to drive the pod door assembly;
    a pneumatic compressor system coupled to the pod structure and configured to deploy one or more deployable stores out of the pod structure;
    a control system coupled to the pod structure and configured to control operation and deployment of the one or more deployable stores; and,
    a power system coupled to the pod structure and configured to provide power to the configurable store stowage and deployment system.

11. The system of claim 10 wherein the one or more deployable stores comprise a missile, an aerodynamic missile, an air to air missile, an aerial bomb, an air to ground bomb, an extended range air to ground bomb, a small diameter bomb, miniature aerial vehicle, an unmanned aerial vehicle, a drone, a joint standoff weapon, a joint standoff missile, a micro-satellite, a multi-payload airborne store comprising an expendable electronic counter measure dispenser and a tactical reconnaissance assembly, or a combination.

12. The system of claim 10 wherein the door drive system comprises an energy storage device, a manual drive input, and a drive train comprising a drive unit control valve, a drive unit, one or more door drive shafts, one or more rotary actuators, and a stop module.

13. The system of claim 10 wherein the pneumatic compressor system comprises a hydraulic reservoir and a hydraulic pump.

14. The system of claim 10 wherein the control system comprises an electronic control unit, a computer, and a logical interface, the control system being coupled between a management system on the aerial vehicle managing the one or more deployable stores and the configurable store stowage and deployment system.

15. The system of claim 10 wherein the power system comprises an electrical power system that converts AC (alternating current) power of the aerial vehicle into DC (direct current) of the configurable store stowage and deployment system for use in the door drive system, the pneumatic compressor system, and the one or more deployable stores.

16. A method for minimizing radar signature and induced aerodynamic drag and for optimizing an interior store volume of an externally mountable, internally configurable store stowage and deployment system on an aerial vehicle, the method comprising:
   providing the externally mountable, internally configurable store stowage and deployment system having a pod structure, the pod structure comprising:
      an externally mountable pod housing comprising:
         a configurable interior volume configured to contain one or more deployable stores;
         a pod housing configuration having a cross-sectional configuration optimized to minimize a radar signature and optimized to minimize an induced aerodynamic drag; and,
      a pod door assembly integral with the pod housing and comprising a plurality of pod doors comprising at least two main doors and at least two seal doors, each main door being coupled to each respective seal door, and further comprising one or more seal door mechanism assemblies, each seal door mechanism assembly coupling each main door to each seal door, and coupling each main door and each seal door to the pod structure, and when each seal door mechanism assembly is in a closed position, each seal door mechanism assembly holds each seal door against a pod structure skin;
   installing the one or more deployable stores and one or more corresponding store ejector devices in the configurable interior volume of the pod housing, where the seal door mechanism assemblies operationally linked to the pod doors provide in an open position a clearance independence such that if one store ejector device fails to deploy the one or more deployable stores coupled to the store ejector device, no trapped deployable stores occur within the pod structure; and,
   mounting to an exterior portion of an aerial vehicle the configurable store stowage and deployment system with the one or more deployable stores installed in the pod structure.

17. The method of claim 16 further comprising reconfiguring the configurable interior volume of the pod housing with a different store configuration.

18. The method of claim 16 further comprising reusing the store stowage and deployment system with a same aerial vehicle or a different aerial vehicle.

19. The method of claim 16 wherein the pod structure is configured for coupling to one or more of a door drive system, an ejector device pneumatic system, a control system, and a power system.

* * * * *